(12) United States Patent
Kogure et al.

(10) Patent No.: US 6,875,484 B1
(45) Date of Patent: Apr. 5, 2005

(54) MULTI-LAYER EXPANSION-MOLDED ARTICLE OF POLYPROPYLENE RESIN, PRODUCTION PROCESS THEREOF, AND CONTAINER, SHOCK-ABSORBING MATERIAL FOR AUTOMOBILE AND AUTOMOTIVE MEMBER FORMED OF THE MULTI-LAYER EXPANSION-MOLDED ARTICLE OF POLYPROPYLENE RESIN

(75) Inventors: Naochika Kogure, Utsunomiya (JP);
Hiroyuki Gokuraku, Imaichi (JP);
Seiji Takahashi, Utsunomiya (JP);
Daisuke Imanari, Utsunomiya (JP);
Takashi Kitahama, Utsunomiya (JP)

(73) Assignee: JSP Corporation, Tokyo (JP)

( * ) Notice: Subject to any disclaimer, the term of this patent is extended or adjusted under 35 U.S.C. 154(b) by 579 days.

(21) Appl. No.: 09/629,949

(22) Filed: Aug. 1, 2000

(30) Foreign Application Priority Data

Aug. 9, 1999 (JP) ............................................. 11-225346

(51) Int. Cl.$^7$ .............................. B32B 1/00; B32B 1/08; B29B 9/00
(52) U.S. Cl. .................... 428/34.1; 428/36.5; 428/36.6; 428/35.7; 264/45.1
(58) Field of Search ............................. 428/36.5, 36.6, 428/35.7

(56) References Cited

U.S. PATENT DOCUMENTS

| | | | | |
|---|---|---|---|---|
| 4,504,534 A | * | 3/1985 | Adachi et al. | ................. 428/71 |
| 5,273,702 A | | 12/1993 | Nelson et al. | |
| 5,602,223 A | * | 2/1997 | Sasaki et al. | ............. 526/348.1 |
| 5,628,453 A | | 5/1997 | MacLaughlin | |
| 5,714,227 A | * | 2/1998 | Sugawara et al. | ............ 428/71 |
| 5,801,205 A | * | 9/1998 | Nishibori et al. | ............. 521/54 |

FOREIGN PATENT DOCUMENTS

| | | |
|---|---|---|
| DE | 4201318 A1 | 9/1993 |
| EP | 06312449 | 11/1994 |
| FR | 2025179 | 9/1970 |
| JP | 06-312449 | 11/1994 |
| JP | 11-171924 | 6/1999 |
| JP | 11-188823 | 7/1999 |
| WO | WO 98/22272 | 5/1998 |
| WO | WO 98/53986 | 12/1998 |
| WO | WO99/28111 | 6/1999 |

OTHER PUBLICATIONS

Derwent WPI, Week 199140, JP 91059819 (Abstract).
Derwent WPI, Week 198951, US 4874649 (JP 93050977) (Abstract).
Derwent WPI, Week 199303, JP 92079819 (Abstract).

(Continued)

*Primary Examiner*—Harold Pyon
*Assistant Examiner*—Marc Patterson
(74) *Attorney, Agent, or Firm*—Sherman & Shalloway

(57) ABSTRACT

A multi-layer expansion-molded article of a polypropylene resin, which is obtained by molding a multi-layer parison comprising a foamed resin layer and a resin layer provided on the outer side of the foamed resin layer in a mold in such manner that at least part of the opposed inner surfaces of foamed resin layer in the parison are fusion-bonded to each other, and has a polypropylene resin layer on the surface of a foamed polypropylene resin layer, wherein a melt tension, $MT_{fr}$ (gf) and a melt flow rate, $MFR_{fr}$ (g/10 min) obtained by measurement to a polypropylene resin forming the foamed resin layer in the expansion-molded article satisfy the relationship [log $MT_{fr}$>−0.74 log $MFR_{fr}$+0.66], and a melt tension, $MT_{ur}$ (gf) and a melt flow rate, $MFR_{ur}$ (g/10 min) obtained by measurement to a polypropylene resin forming the resin layer on the surface of the foamed resin layer satisfy the relationship [log $MT_{ur}$>−1.02 log $MFR_{ur}$+ 0.47].

12 Claims, 11 Drawing Sheets

OTHER PUBLICATIONS

Derwent WPI, Week 199507, JP 95002391 (Abstract).
Derwent WPI, Week 199227B, JP 4147832 (Abstract).
Derwent WPI, Week 199420B, JP 6107038 (Abstract).
Derwent WPI, Week 199445B, JP 6285964 (Abstract).
Derwent WPI, Week 199504B, JP 6312449 (Abstract).
Derwent WPI, Week 199508B, JP 6335955 (Abstract).
Derwent WPI, Week 198727, JP 55116549 (Abstract).
Derwent WPI, Week 198106B, JP 55156032 (Abstract).
Derwent WPI, Week 198716, JP 58124637 (Abstract).
Derwent WPI, Week 198124B, JP 56044632 (Abstract).
Derwent WPI, Week 199503, US 5366674 (JP 6339979) (Abstract).
Derwent WPI, Week 198312, JP 83010217 (Abstract).
Patent Abstract of Japan, vol. 017, No. 260, May 21, 1993, & JP 05 000429 A (Idemitsu Petrochem Co Ltd).
Patent Abstract of Japan, vol. 007, No. 237, Oct. 21, 1983, & JP 58 126122 A (Mitsubishi Monsanto Kasei KK; Others:01).
V.V. Demaoi, D. Dong, A. Gupta: ANTEC 2000 Plastics: The Magical Solution. vol. 1.

* cited by examiner

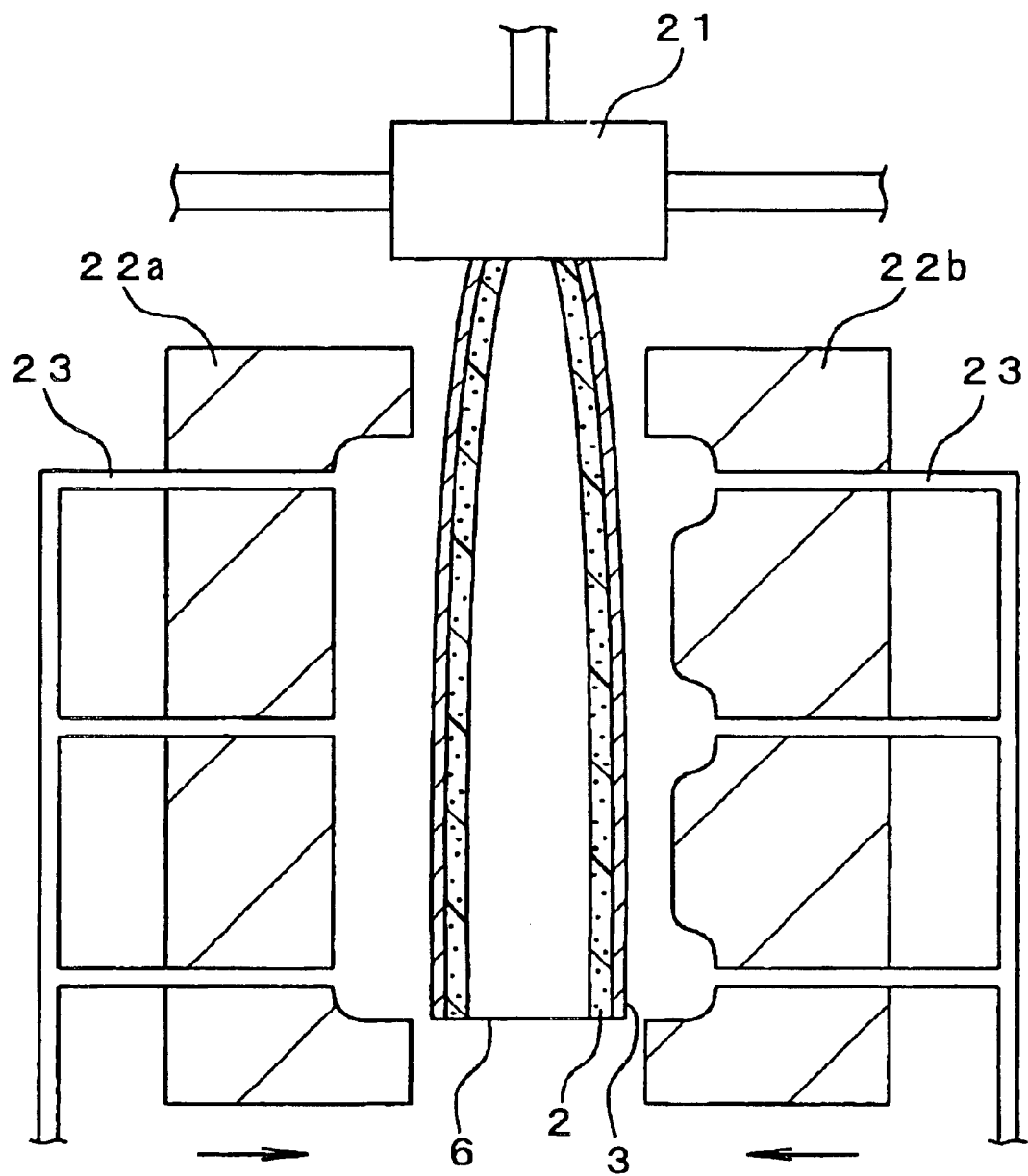
F I G. 4

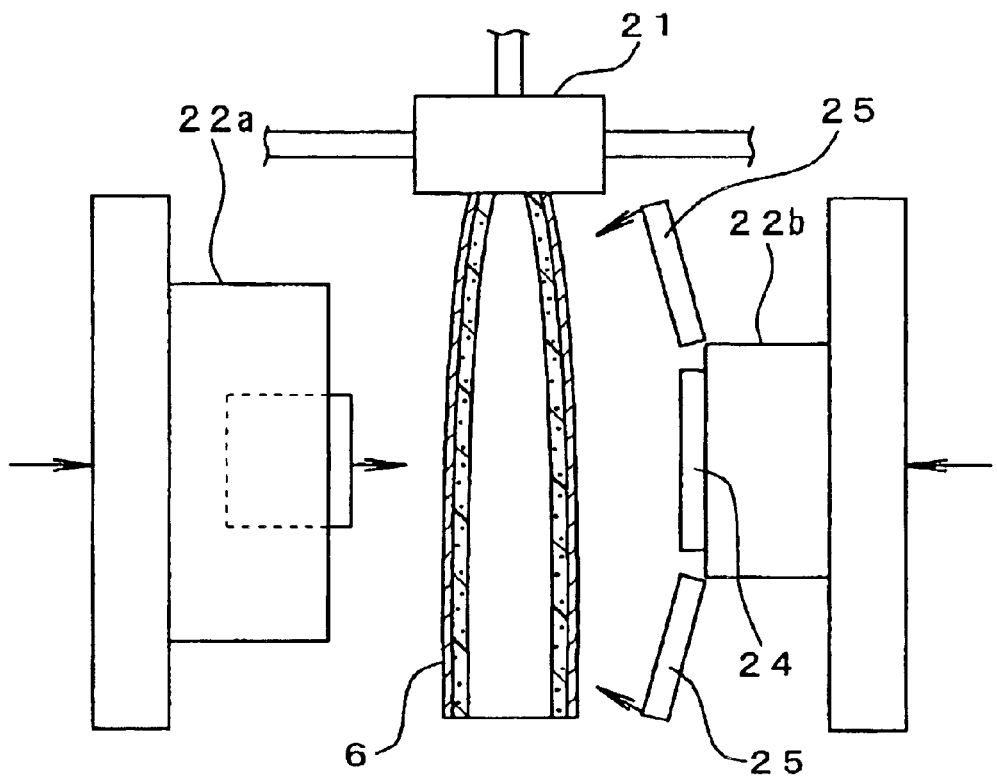
F I G. 6A
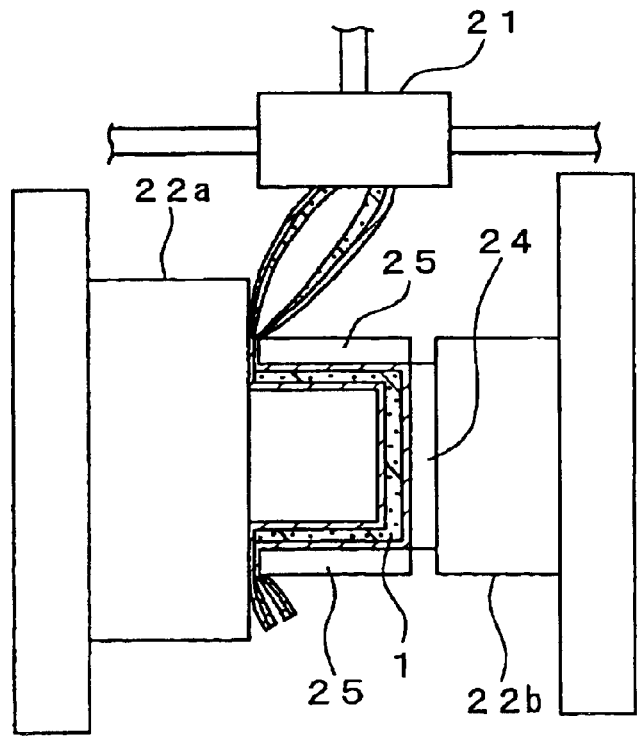
F I G. 6B

MULTI-LAYER EXPANSION-MOLDED ARTICLE OF POLYPROPYLENE RESIN, PRODUCTION PROCESS THEREOF, AND CONTAINER, SHOCK-ABSORBING MATERIAL FOR AUTOMOBILE AND AUTOMOTIVE MEMBER FORMED OF THE MULTI-LAYER EXPANSION-MOLDED ARTICLE OF POLYPROPYLENE RESIN

BACKGROUND OF THE INVENTION

1. Field of the Invention

The present invention relates to a multi-layer expansion-molded article of a polypropylene resin, which has a polypropylene resin layer on the surface of a foamed polypropylene resin layer, and is used as, for example, a light-weight heat insulating panel utilized for a floor, door or the like, a pallet, a container, an automotive member, or the like.

2. Description of the Background Art

Multi-layer resinous expansion-molded articles in various forms, in which a thermoplastic resin layer is formed on the surface of a foamed resin layer, have heretofore been known. In recent years, the problem of refuse has been causing great concern, and so there has been a demand for changing containers for fishery products made of an expansion-molded article of polystyrene resin particles, and the like, which have heretofore been disposable, to containers made of a multi-layer resinous expansion-molded article, in which a polypropylene resin layer is formed on the surface of a foamed polypropylene resin layer, to circulate them as returnable containers capable of sterilizing with steam. Automotive members and the like have also been required to constitute with members made of the same multi-layer resinous expansion-molded article having a polypropylene resin layer on its surface as described above from the viewpoints of recycling ability, strength, lightweight property, heat insulating property and sound absorbing property.

As this kind of multi-layer resinous expansion-molded articles, there have been known those obtained by a process in which a molded article of a hollow structure is formed with a thermoplastic resin to use it as a resin layer, and a polyurethane resin is poured into the cavity within the molded article, or foamed beads of a resin are filled thereinto to mold (Japanese Patent Publication No. 10217/1983, Japanese Patent Application Laid-Open No. 339979/1994, etc.). However, this process has involved problems that the molding process of the multi-layer resinous expansion-molded article becomes complicated, and a special molding machine is required, since a step of forming the resin layer which becomes a skin and a step of forming a foamed layer in the inside of the resin layer are separately conducted. It has hence been difficult to provide the multi-layer resinous expansion-molded article on the cheap.

There has also been proposed a process in which a hollow multi-layer parison with a thermoplastic resin layer provided on the surface of a foamed resin layer is molded while compressing it in a mold to cause the opposed inner surfaces of the parison to be fusion-bonded to each other, thereby obtaining a multi-layer resinous expansion-molded article (Japanese Patent Publication No. 27978/1987, Japanese Patent Application Laid-Open No. 312449/1994, etc.).

However, such a process of molding the multi-layer parison while compressing it in the mold as described above has involved a problem that it is difficult to provide any expansion-molded article having a resin layer having a uniform thickness, and so irregularities occur in the surface of the resulting expansion-molded article to impair its appearance, or the resin layer cracks or bores when a molded article having a relatively high draw ratio, such as a container, is formed. In addition, this process has also involved a problem that when a polypropylene resin is used as a base resin, it is difficult to obtain a molded article having a low-density foamed resin layer the density of which is as low as at most 0.4 g/cm$^3$, or when it is attempted to make the density of the foamed resin layer low, the resulting foamed resin layer tends to cause cell collapse and formation of open cells. As described above, this process has involved some problems to be solved.

SUMMARY OF THE INVENTION

The present invention has been completed in view of the above-described problems involved in the prior art, and has as its object the provision of a multi-layer expansion-molded article of a polypropylene resin, which can be produced without need of such complicated processes that a molded article, which will becomes a resin layer on the surface of a foamed resin layer, is formed, and a foam is then poured thereinto, and is beautiful in appearance and excellent in lightweight property, mechanical strength, heat insulating property, cushioning property, chemical resistance, recycling ability, etc., a production process thereof and a container automotive members produced thereby.

According to the present invention, there is thus provided a multi-layer expansion-molded article of a polypropylene resin, which is obtained by molding a multi-layer parison comprising a foamed resin layer and a resin layer provided on the outer side of the foamed resin layer in a mold in such manner that at least part of the opposed inner surfaces of the foamed resin layer in the parison are fusion-bonded to each other, and has a polypropylene resin layer on the surface of a foamed polypropylene resin layer, wherein a melt tension, MT (gf) and a melt flow rate, MFR (g/10 min) obtained by measurement to a polypropylene resin forming the foamed resin layer in the expansion-molded article satisfy the following relationship (1), and a melt tension, MT (gf) and a melt flow rate, MFR (g/10 min) obtained by measurement to a polypropylene resin forming the resin layer on the surface of the foamed resin layer satisfy the following relationship (2) when the melt flow rate, MFR is at least 0.3 (g/10 min), or the melt tension, MT is at least 10 (gf) when the melt flow rate, MFR is not lower than 0.2 (g/10 min), but lower than 0.3 (g/10 min):

$$\log MT > -0.74 \log MFR + 0.66 \quad (1)$$

$$\log MT > -1.02 \log MFR + 0.47 \quad (2)$$

According to the present invention, there is also provided a multi-layer expansion-molded article of a polypropylene resin, which is obtained by molding a multi-layer parison comprising a foamed resin layer and a resin layer provided on the outer side of the foamed resin layer in a mold in such manner that at least part of the opposed inner surfaces of the foamed resin layer in the parison are fusion-bonded to each other, and has a polypropylene resin layer on the surface of a foamed polypropylene resin layer, wherein a melt tension, MT (gf) and a melt flow rate, MFR (g/10 min) obtained by measurement to a polypropylene resin forming the foamed resin layer in the expansion-molded article satisfy the following relationship (3), and a melt tension, MT (gf) and a melt flow rate, MFR (g/10 min) obtained by measurement to a polypropylene resin forming the resin layer on the surface of the foamed resin layer satisfy the following relationship (4) when the melt flow rate, MFR is at least 0.5 (g/10 min), or the melt tension, MT is at least 10 (gf) when the melt flow rate, MFR is not lower than 0.2 (g/10 min), but lower than 0.5 (g/10 min):

$$\log MT > -0.74 \log MFR + 0.79 \quad (3)$$

$$\log MT > -1.02 \log MFR + 0.69 \quad (4)$$

The expansion-molded article according to the present invention may preferably include a molded article in which the thickness of the propylene resin layer is 100 μm to 10 mm, and the overall density of the expansion-molded article is 20 to 400 kg/m$^3$. In the expansion-molded article according to the present invention, the area ratio of the fusion-bonded portion in the inner surface of the expansion-molded article may preferably be at least 25%, more preferably at least 60%, still more preferably at least 80%, particularly preferably at least 95%. The expansion-molded article according to the present invention may further have a skin layer formed of a synthetic resin on the outer side of the resin layer.

According to the present invention, there is further provided a process for producing a multi-layer expansion-molded article of a polypropylene resin, which comprises co-extruding a foamable molten resin obtained by adding a foaming agent to a polypropylene resin whose melt tension, MT (gf) and melt flow rate, MFR (g/10 min) satisfy the following relationship (1), and melting and kneading the resultant mixture, and a molten resin obtained by melting and kneading a polypropylene resin whose melt flow rate, MFR (g/10 min) is at least 0.3 (g/10 min), and whose melt tension, MT (gf) and melt flow rate, MFR (g/10 min) satisfy the following relationship (2), or whose melt flow rate, MFR is not lower than 0.1 (g/10 min), but lower than 0.3 (g/10 min) and whose melt tension, MT is at least 10 (gf), thereby forming a multi-layer parison having a resin layer composed of the molten resin on the surface of a foamed resin layer obtained by expanding the foamable molten resin, and then molding the multi-layer parison in a mold in such manner that at least part of the opposed inner surfaces of the foamed resin layer in the parison are fusion-bonded to each other to obtain an expansion-molded article having a polypropylene resin layer on the surface of a foamed polypropylene resin layer:

$$\log MT > -0.74 \log MFR + 0.66 \quad (1)$$

$$\log MT > -1.02 \log MFR + 0.47 \quad (2)$$

According to the present invention, there is still further provided a process for producing a multi-layer expansion-molded article of a polypropylene resin, which comprises co-extruding a foamable molten resin obtained by adding a foaming agent to a polypropylene resin whose melt tension, MT (gf) and melt flow rate, MFR (g/10 min) satisfy the following relationship (5), and melting and kneading the resultant mixture, and a molten resin obtained by melting and kneading a polypropylene resin whose melt flow rate, MFR (g/10 min) is at least 0.8 (g/10 min), and whose melt tension, MT (gf) and melt flow rate, MFR (g/10 min) satisfy the following relationship (6), or whose melt flow rate, MFR is not lower than 0.2 (g/10 min), but lower than 0.8 (g/10 min) and whose melt tension, MT is at least 10 (gf), thereby forming a multi-layer parison having a resin layer composed of the molten resin on the surface of a foamed resin layer obtained by expanding the foamable molten resin, and then molding the multi-layer parison in a mold in such manner that at least part of the opposed inner surfaces of the foamed resin layer in the parison are fusion-bonded to each other to obtain an expansion-molded article having a polypropylene resin layer on the surface of a foamed polypropylene resin layer:

$$\log MT > -0.74 \log MFR + 1.14 \quad (5)$$

$$\log MT > -1.02 \log MFR + 0.90 \quad (6)$$

In the processes according to the present invention, the polypropylene resin used for the foamable molten resin may preferably have an MFR of 0.3 to 20 g/10 min.

According to the present invention, there is yet still further provided a container formed of the multi-layer expansion-molded article of the polypropylene resin described above, wherein the overall density of the container is 30 to 400 kg/M$^3$, and the thickness of the polypropylene resin layer is 200 μm to 5 mm.

According to the present invention, there is yet still further provided a shock-absorbing material for automobile formed of the multi-layer expansion-molded article of the polypropylene resin described above, wherein the overall density of the shock-absorbing material is 25 to 300 kg/m$^3$, and the thickness of the polypropylene resin layer is 200 μm to 7 mm.

According to the present invention, there is yet still further provided a member for automobile formed of the multi-layer expansion-molded article of the polypropylene resin described above.

The member for automobile may be a member selected from among a bumper, pillar, instrument panel, spoiler, fender, side step, door trim, grille guard and trunk board.

BRIEF DESCRIPTION OF THE DRAWINGS

The above and other objects, features and advantages of the present invention will become apparent from the following description and the appended claims, taken in conjunction with the accompanying drawings, in which:

FIG. 4 illustrates a step in the production process of an expansion-molded article according to the present invention.

FIGS. 6A and 6B illustrates another embodiment of the production process of an expansion-molded article according to the present invention.

DETAILED DESCRIPTION OF THE PREFERRED EMBODIMENTS

Figure 1A:
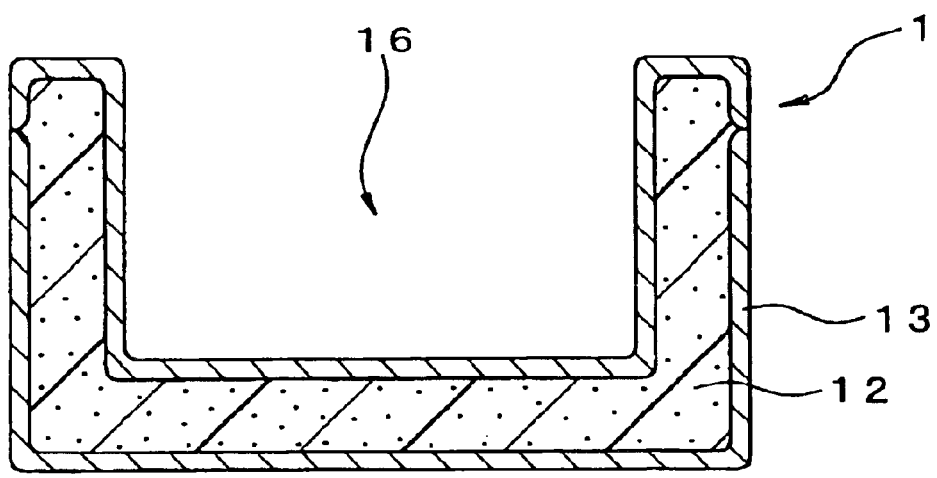
FIGS. 1A and 1B are longitudinal cross-sectional views illustrating examples of an expansion-molded article according to the present invention.
Figure 1B:
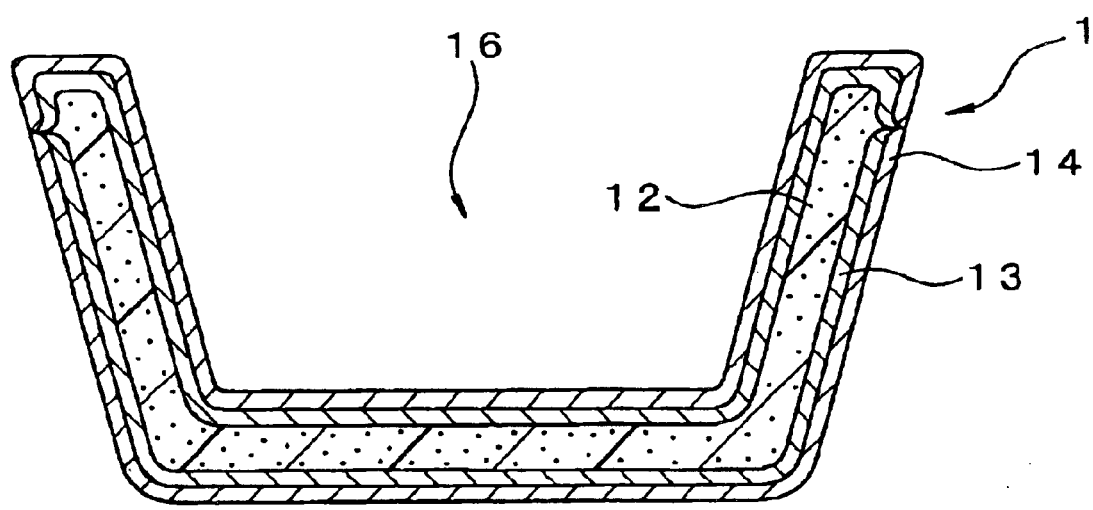

The present invention will hereinafter be described with reference to the accompanying drawings. Specific examples of the multi-layer expansion-molded article of the polypropylene resin (hereinafter may be referred to as the "expansion-molded article" simply) according to the present invention are illustrated in FIGS. 1A and 1B. As illustrated in FIGS. 1A and 1B, the expansion-molded articles 1 according to the present invention have a structure that a polypropylene resin layer 13 is formed on the surface of an foamed polypropylene resin layer 12.

Figure 2A:
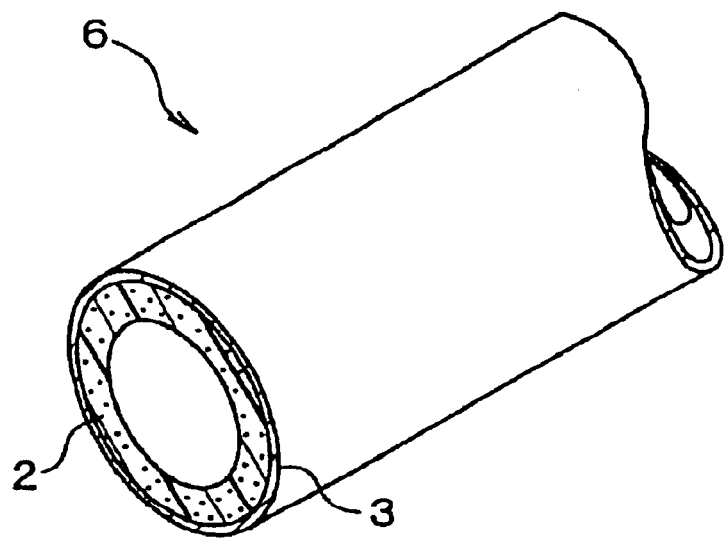
FIGS. 2A and 2B are partly cutaway views in perspective illustrating examples of a multi-layer parison used in the production of an expansion-molded article according to the present invention.
Figure 2B:
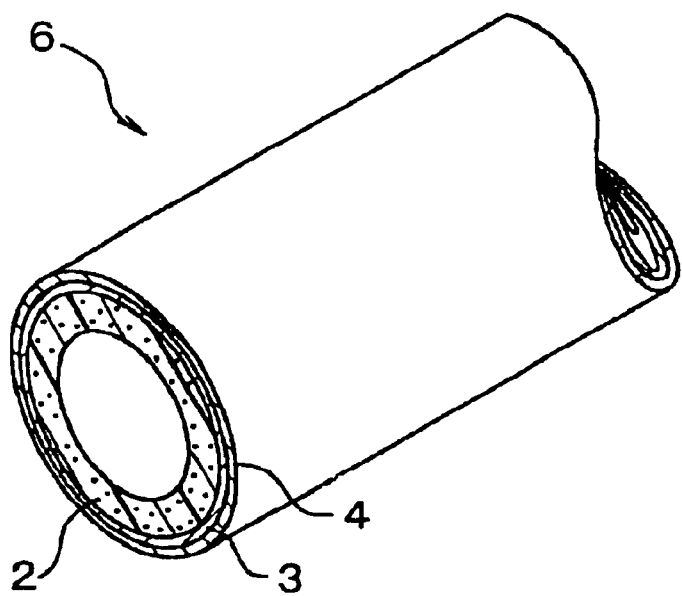

The expansion-molded article 1 according to the present invention is obtained by holding a multi-layer parison in a mold to compression-mold it. The term "parison" as used in the present invention means a tubular or any other hollow plastic formed or molded article obtained by bonding the opposed ends of two sheets to each other, or extrusion, injection molding or the like and such that generally used in molding such as blow molding. FIGS. 2A and 2B illustrate examples of the multi-layer parison 6. The expansion-molded articles 1 illustrated in FIGS. 1A and 1B are obtained from the multi-layer parison illustrated in FIG. 2A and the multi-layer parison illustrated in FIG. 2B, respectively.

The multi-layer parison illustrated in FIG. 2A has a structure that a polypropylene resin layer 3 is laminated on the outer surface of a foamed polypropylene resin layer 2, and the multi-layer parison illustrated in FIG. 2B has a structure that a skin layer 4 is further laminated on the surface of the resin layer 3 of the multi-layer parison shown in FIG. 2A.

As the resin layer 3, is preferably used a non-foamed body, a foamed body having a density of at least 0.4 g/cm³ or a inorganic material-filled non-foamed body. The multi-layer parison 6 can be obtained by uniting and laminating a foamable molten resin prepared by adding a foaming agent to a polypropylene resin forming a foamed resin layer 2, and melting and kneading the resultant mixture in an extruder, and a molten resin prepared by melting a polypropylene resin forming a resin layer 3 in another extruder (or in order to obtain a multi-layer parison further having a skin layer 4 on the face side of the resin layer 3, a molten resin prepared by melting a resin forming the skin layer 4 in a further extruder) in a die for co-extrusion, and co-extruding them through the die to a lower-pressure zone, thereby expanding the foamable molten resin.

The polypropylene resin layer 13 (hereinafter may be referred to as "the resin layer 13 of the expansion-molded article" or simply "the resin layer 13") in the expansion-molded article 1 according to the present invention corresponds to the resin layer 3 of the multi-layer parison 6. On the other hand, the foamed polypropylene resin layer 12 (hereinafter may be referred to as "the foamed resin layer 12 of the expansion-molded article" or simply "the foamed resin layer 12") in the expansion-molded article 1 corresponds to the foamed resin layer 2 of the multi-layer parison 6. The skin layer 4 in the multi-layer parison illustrated in FIG. 2B corresponds to the skin layer 14 (hereinafter may be referred to as "the skin layer 14 of the expansion-molded article" or simply "the skin layer 14") provided on the outer side of the resin layer 13 of the expansion-molded article 1 illustrated in FIG. 1B.

As the polypropylene resin used for forming the foamed resin layer 12 of the expansion-molded article, i.e., the polypropylene resin used for forming the foamed resin layer 2 of the multi-layer parison 6, is used a polypropylene resin (hereinafter referred to as "Specific Polypropylene Resin A" simply) comprising a polypropylene resin as a main component, whose melt tension, MT (gf) and melt flow rate, MFR (g/10 min) satisfy the following relationship (1):

$$\log MT > -0.74 \log MFR + 0.66 \qquad (1)$$

The use of a polypropylene resin which does not satisfy the relationship (1) fails to form a formed resin layer 2 having a high expansion ratio and a great thickness. Specific Polypropylene Resin A used for forming the foamed resin layer 2 is preferably such that the MT (gf) and MFR (g/10 min) satisfy the following relationship (5). Such a polypropylene resin permits the formation of a foamed resin layer 2 having a higher expansion ratio and a greater thickness.

$$\log MT > -0.74 \log MFR + 1.14 \qquad (5)$$

The MFR of Specific Polypropylene Resin A is preferably 0.3 to 20 g/10 min. If MFR is lower than 0.3 g/10 min, the foam extrusion temperature of a foamable molten resin obtained by melting and kneading such a Specific Polypropylene Resin A and a foaming agent must be made high. As a result, there is a possibility that the viscoelasticity of the resin may be lowered, so that the foaming agent may escape from the resin, resulting in a failure to form a foamed resin layer 2 of a closed cell structure. On the other hand, if MFR exceeds 20 g/10 min, the resultant foamed resin layer 2 of the multi-layer parison undergoes great drawdown due to its high flowability upon heating and molding, and so the provision of a large-sized expansion-molded article requires to take measures against a production apparatus therefor.

As the polypropylene resin used for forming the resin layer 13 of the expansion-molded article, i.e., the polypropylene resin used for forming the resin layer 3 of the multi-layer parison 6, is used a polypropylene resin (hereinafter referred to as "Specific Polypropylene Resin B" simply) comprising a polypropylene resin as a main component, whose melt tension, MT (gf) and melt flow rate, MFR (g/10 min) satisfy the following relationship (2) when the MFR is at least 0.3 (g/10 min) or whose MT is at least 10 (gf) when the MFR is not lower than 0.1 (g/10 min), but lower than 0.3 (g/10 min):

$$\log MT > -1.02 \log MFR + 0.47 \qquad (2)$$

When a polypropylene resin which does not satisfy the relationship (2) when the MFR is at least 0.3 (g/10 min), or a polypropylene resin whose MFR is not lower than 0.1 (g/10 min), but lower than 0.3 (g/10 min) and whose MT is lower than 10 (gf) is used to form a resin layer 3 of the multi-layer parison, the resultant resin layer 3 can not follow the extension of the foamed resin layer 2 upon the molding of such a parison by a molding machine, so that uneven extension occurs in the resin layer 3 to cause a scale pattern, cracks and/or holes in the surface of the resin layer 3. As a result, the resin layer 13 of the resulting expansion-molded article 1 also becomes insufficient. Besides, since any resin having an MFR of lower than 0.1 (g/10 min) is low in flowability, the use of such a low-MFR resin makes it difficult to extrude the molten resin for forming the resin layer 3 unless the extrusion temperature in the die is made high. On the other hand, the foamable molten resin for forming the foamed resin layer 2 requires to lower the foam extrusion temperature in the die until a viscosity suitable for expansion is achieved. Therefore, when the resin having an MFR of lower than 0.1 (g/10 min) is used as a resin for forming the resin-layer 3, it is difficult to provide a good multi-layer parison by co-extruding it with the foamable molten resin for forming the foamed resin layer 2, and the heat of the molten resin for forming the resin layer 3 causes such problems that the cell structure of the foamed resin layer 2 is destroyed. When the MT of Specific Polypropylene Resin B is at least 10 (gf), the poor flowability of Specific Polypropylene Resin B can be offset by its strong tension upon melting so far as the MFR is at least 0.1 (g/10 min). Accordingly, a good expansion-molded article 1 can be provided without causing a scale pattern, cracks, holes and/or the like in the resin layer 13 of the molded article by taking the production conditions of the multi-layer parison, the molding conditions of the parison and the like into adequate consideration. Incidentally, the MFR of Specific Polypropylene Resin B is preferably at most 20 (g/10 min) for the purpose of preventing the drawdown of the resulting multi-layer parison 6. A polypropylene resin whose MFR is at least 0.5 (g/10 min), and whose MT (gf) and MFR (g/10 min) satisfy the following relationship (4), or whose MFR is not lower than 0.2 (g/10 min), but lower than 0.5 (g/10 min), and whose MT is at least 10 (gf) is preferred as Specific Polypropylene Resin B. A polypropylene resin whose MFR is at least 0.8 (g/10 min); and whose MT (gf) and MFR (g/10 min) satisfy the following relationship (6), or whose MFR is not lower than 0.2 (g/10 min), but lower than 0.8 (g/10 min), and whose MT is at least 10 (gf) is more preferred as Specific Polypropylene Resin B. The use of such a resin B provides a good expansion-molded article 1 having a resin layer 13 evener in thickness.

$$\log MT > -1.02 \log MFR + 0.69 \quad (4)$$

$$\log MT > -1.02 \log MFR + 0.90 \quad (6)$$

The above-described specific resins A and B can be obtained in accordance with, for example, the following process. Namely, such a resin can be obtained by a process in which an ordinary polypropylene resin (the ordinary polypropylene resin used for obtaining Specific Polypropylene Resins A and B will hereinafter be referred to as "the raw polypropylene resin" in order to distinguish it from Specific Polypropylene Resins A and. B) low in MT, a peroxide lower in 1-minute half-life temperature than the melting point of the raw polypropylene resin, and a main chain scission-preventing agent are poured into an aqueous medium to stir them, thereby impregnating the raw polypropylene resin with the peroxide and main chain scission-preventing agent such temperature and time conditions that the decomposition of the peroxide is prevented as much as possible, and at least a half of the whole peroxide remains, and the raw resin is then held for a prescribed period of time under temperature conditions that the 1-minute half-life temperature of the peroxide used is reached to decompose to the peroxide, thereby slightly crosslinking the raw polypropylene resin in such a manner that its gel content is lower than 1%, or a process in which a low-temperature decomposing peroxide (1-minute half-life temperature: room temperature to about 120° C.) is mixed with a raw polypropylene resin containing an atactic component and/or a component that is isotactic, but is not crystalline to heat the resultant mixture at 120° C. or lower, thereby bonding the atactic component and/or the non-crystalline isotactic component as a branched chain to the main chain of the raw polypropylene resin to provide a polypropylene resin having long-chain branches. Incidentally, the 1-minute half-life temperature of the peroxide means a temperature at which the half-life of the peroxide becomes 1 minute.

In the above-described process, as the raw polypropylene resin, may be used a propylene homopolymer or a copolymer of propylene with other monomers. Examples of the other monomers include ethylene, 1-butene, isobutylene, 1-pentene, 3-methyl-1-butene, 1-hexene, 3,4-dimethyl-1-butene, 1-heptene and 3-methyl-1-hexene. The copolymer may be either a random copolymer or a block copolymer.

When a copolymer is used as the raw polypropylene resin, it is preferred that a proportion of other monomer components in the copolymer be at most 5.0% by weight for the random copolymer or at most 20.0% by weight for the block copolymer in order that the properties inherent in the polypropylene resin are not impaired.

Such raw polypropylene resins as described above may be used either singly or in any combination thereof. With the raw polypropylene resin, may be mixed other resin components such as ethylene resins such as high density polyethylene, low density polyethylene, linear low density polyethylene, linear very low density polyethylene, ethylene-butene copolymers and ethylene-maleic anhydride copolymers, ethylene-vinyl acetate copolymers, and styrene resins within limits not impeding the properties inherent in polypropylene as needed.

Examples of the peroxide used for preparing Specific Polypropylene Resins A and B from the raw polypropylene resin include lauroyl peroxide, m-toluoyl-benzoyl peroxide, benzoyl peroxide and bis (4-butylcyclo-hexyl) peroxydicarbonate. Among these, a peroxide whose 1-minute half-life temperature is lower than the melting point of the raw polypropylene resin used is selected. The main chain scission-preventing agent serves to prevent the main chain of the raw polypropylene resin being cut by the peroxide. For example, methyl methacrylate, divinylbenzene, triallyl cyanurate or the like is used. As the aqueous medium, is generally water to which a surfactant has been added.

Specific Polypropylene Resin A satisfying the relationship (1) between MT and MFR can be obtained by controlling the length of branched chains and the proportion of branch points of the polypropylene resin having branched chains obtained in the above-described process. In particular, the length of the branched chains is lengthened, and the proportion of the branch points is relatively lessened, thereby obtaining Specific Polypropylene Resin A satisfying the relationship (5). Besides, Specific Polypropylene Resin B satisfying the relationship (2) between MT and MFR can be prepared in the same manner as in the above-described Specific Polypropylene Resin A or may be obtained by improving its flowability with a lubricant or the like even in a polypropylene resin of a linear structure. In particular, a polypropylene resin having branched chains is selected for preparation, thereby obtaining Specific Polypropylene Resin B satisfying the relationship (4) or (6).

However, the above-described processes are examples for obtaining Specific Polypropylene Resins A and B, and Specific Polypropylene Resins A and B respectively used as base resins for forming the foamed resin layer 12 of the expansion-molded article and the resin layer 13 thereof are not limited to those obtained by the above-described processes, and no particular limitation is imposed on the procurement methods thereof so far as the resulting polymer satisfies the relationship between melt tension (MT) and melt flow rate (MFR). The designations of Specific Polypropylene Resins A and B are used for conveniently distinguishing the polypropylene resin used for forming the foamed resin layer 12 of the expansion-molded article and meeting the above-described specific requirements from the polypropylene resin used for forming the resin layer 13 of the expansion-molded article and meeting the above-described specific requirements. Accordingly, when a polypropylene resin meeting both requirements for the resin for forming the foamed resin layer 12 of the expansion-molded article and requirements for the resin for forming the resin layer 13 of the expansion-molded article is used, the foamed resin layer 12 and resin layer 13 of the expansion-molded article can also be formed with the same base resins. When the expansion-molded article according to the present invention after use, and scrap and burr occurred upon the production of the expansion-molded article are used as a recycle material by, for example, melting them, they may be recycled for use without limit so far as they satisfy the conditions for Specific Polypropylene Resins A and B.

Specific Polypropylene Resins A and B also include those in which other polymers than Specific Polypropylene Resins A and B are mixed as needed. However, it goes without saying that the resin obtained by mixing another polymer must satisfy the relationship between MT and MFR in Specific Polypropylene Resins A and B.

As other polymers capable of mixing with Specific Polypropylene Resins A and B, may be used the same resins as those exemplified as other resin components capable of mixing with the raw polypropylene resin in the above-described processes as examples for obtaining Specific Polypropylene Resins A and B, and besides rubber such as ethylene-propylene rubber; polystyrene elastomers such as styrene-butadiene-styrene block copolymers, styrene-isoprene-styrene block copolymers and hydrogenated products thereof; and polyolefin elastomers comprising a polyolefin copolymer such as a propylene-ethylene block copolymer as a hard segment and polyolefin copolymer rubber such as an ethylene-propylene random copolymer or ethylene-propylene-diene random copolymer as a soft segment; and the like.

Incidentally, when a proportion of other polymer components than the polypropylene component in Specific Polypropylene Resin A or B is increased, the properties inherent in the polypropylene resin may possibly be impaired even when such a polymer satisfies the relationship between MT and MFR. Therefore, when other polymers are mixed with Specific Polypropylene Resin A or B, the mixture is prepared so as to contain the polypropylene component in a proportion of at least 65% by weight, preferably at least 80% by weight in the resin after the mixing.

Incidentally, Specific Polypropylene Resins A and B used in the present invention may be those prepared in such a manner that the MT and MFR of the resulting mixtures satisfy the respective relationships between MT and MFR by suitably mixing other polymers than the raw polypropylene resin with the raw polypropylene resin.

Figure 3:
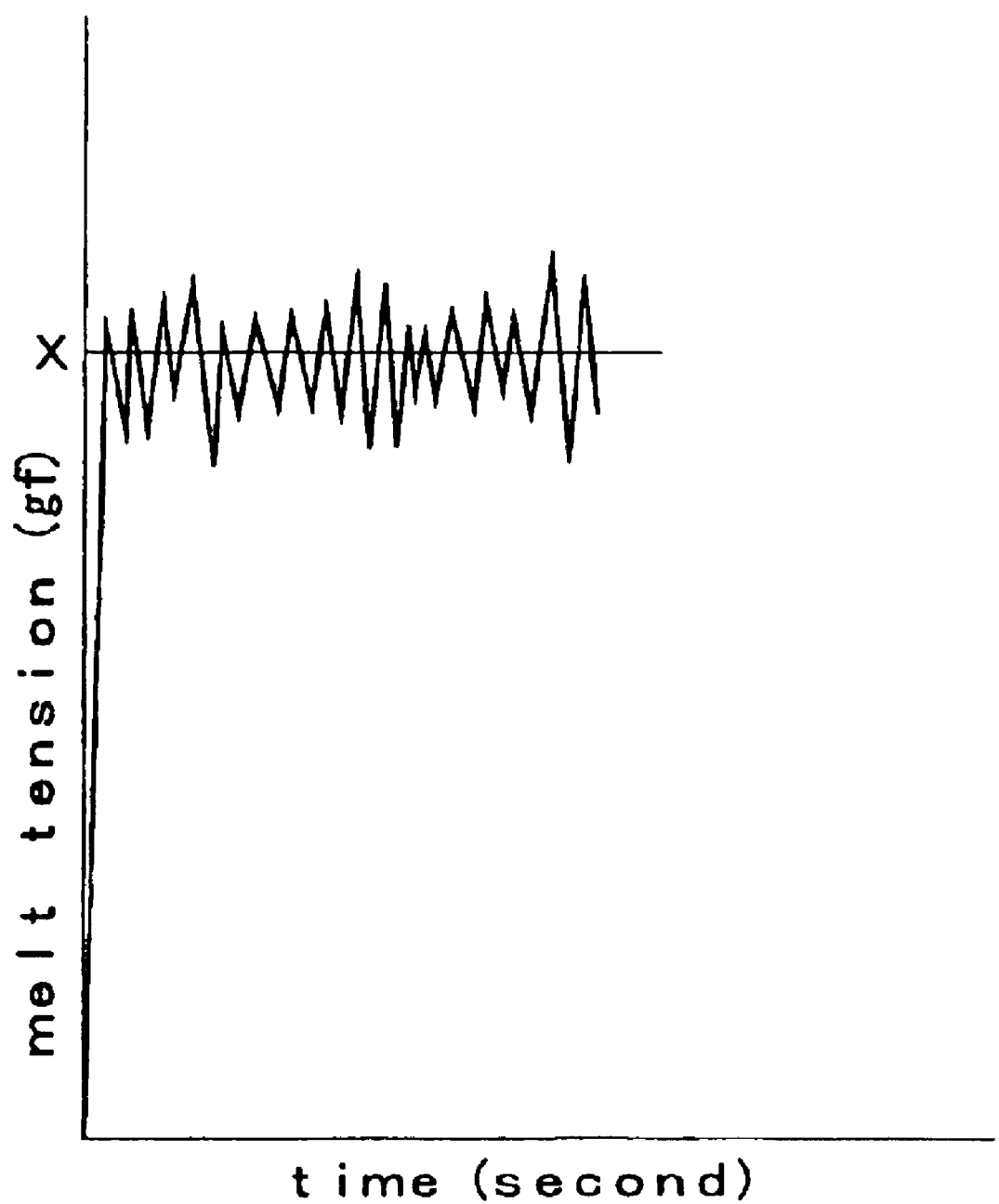
FIG. 3 diagrammatically illustrates the relationship between melt tension and time in the measurement of the melt tension.

The melt tension (MT) in the present specification can be measured by means of a Melt Tension Tester II Model manufactured by Toyo Seiki Seisaku-Sho, Ltd. or the like, which has been produced in accordance with ASTM D 1238. Specifically, a melt tension tester equipped with a cylindrical orifice having a straight hole having a hole diameter of 2.09 mm and a length of 8 mm is used, a resin sample is extruded into a strand through the orifice under conditions of a resin temperature of 230° C. and a piston speed of 10 mm/min to hang the strand on a pulley for detection of tension having a diameter of 45 mm, and the strand is taken up on a take-up roll having a diameter of 50 mm while gradually increasing take-up speed in a proportion of about 5 rpm/sec (take-up acceleration of strand:about $1.3 \times 10^{-2}$ m/sec$^2$). The take-up speed is first increased until the strand hanged on the pulley for detection of tension is broken to determine a take-up speed R (rpm) at the time the strand has been broken. The strand is then taken up at a fixed take-up speed of R×0.7 (rpm) to measure a melt tension (MT) of the strand detected by a detector connected to the pulley for detection of tension with time and chart it taking MT (gf) on an axis of ordinate and time (second) on an axis of abscissa, thereby obtaining a graph having such amplitude as illustrated in FIG. 3. The MT in the present invention means a median (X) of amplitude at a stable amplitude portion. However, when the strand is not broken even at the time the take-up speed has reached 500 (rpm), a value determined as described above from a graph obtained by take-up at a take-up speed of 500 (rpm) is regarded as a melt tension (MT). Incidentally, specific amplitude occurred rarely on the above graph is ignored. With respect to the melt flow rate (MFR), a value obtained by the measurement at 230° C. under a load of 2.16 kgf described in JIS K 721.0 is adopted.

In the case of the expansion-molded article 1 further having the skin layer 14 on the outer surface of the resin layer 13, examples of a resin or polymer (hereinafter referred to as resin simply) used for forming the skin layer 14 include thermoplastic resins, such as polyethylene resins such as low density polyethylene, high density polyethylene and linear low density polyethylene; polypropylene resins such as homopolypropylene, propylene-ethylene random copolymers, propylene-1-butene random copolymers, propylene-ethylene-1-butene random terpolymers, propylene-ethylene block copolymers and propylene-1-butene block copolymers; cyclic polyolefins; polycarbonate resins; polyester resins; polystyrene elastomers; polyolefin elastomers; and polyester elastomers. These resins may be used either singly or in any combination thereof. Incidentally, when a resin forming the skin layer having no practically sufficient thermal adhesion to the resin forming the resin layer 13 of the expansion-molded article 1 is used among these resins, it is preferable to provide an adhesive layer between the skin layer 14 and the resin layer 13. Incidentally, it is preferable to use a polyolefin elastomer, polystyrene elastomer or high-impact polystyrene as the skin layer 14 from the viewpoint of impact resistance of the resulting molded article, and it is particularly preferable to use a polypropylene elastomer from the viewpoints of heat resistance and impact resistance. The skin layer 14 is not limited to a film or sheet, but may be in a fibrous form such as a nonwoven fabric or woven fabric. The skin layer 14 is not limited to a single layer, but may be multi-layer.

Various additives such as infrared absorbers, infrared reflecting agents, flame retardants, flowability improvers, weathering stabilizers, colorants, heat stabilizers, antioxidants, nucleating agents, inorganic fillers and rubber may be suitably incorporated into the foamed resin layer 12, resin layer 13 and skin layer 14 of the expansion-molded article 1 as needed. It is particularly preferable that an inorganic material such as short fiber or clay be subjected to a surface treatment and added to the respective layers, thereby enhancing stiffness of the layers to provide an expansion-molded article 1 having high stiffness.

The thickness of the resin layer 13 of the expansion-molded article 1 according to the present invention is preferably 100 μm to 10 mm, more preferably 100 μm to 7 mm. If the thickness of the resin layer 13 is too small, the molded article 1 has a possibility that the surface smoothness thereof may be deteriorated to make the surface appearance thereof poor. If the thickness of the resin layer 13 is too great, the whole weight of the expansion-molded article 1 becomes heavy, so that it is hard to say that the molded article is light-weight according to the use of the molded article 1, and moreover the closed cell content in the foamed resin layer 12 of the expansion-molded article 1 may lower in some cases. More specifically, since the resin layer and the foamed resin layer are simultaneously extruded through a co-extrusion die by a co-extrusion process, the quantity of heat of a molten resin forming the resin layer becomes high when the thickness of the resin layer is great, so that the foamed resin layer is heated by such heat, and the viscosity of the resin forming the foamed resin layer is lowered to fail to maintain cells, resulting in lowering of the closed cell content in the foamed resin layer.

A relatively high-density core layer can be caused to exist at a fusion-bonded portion of the opposed foamed resin layers in the inner surface of the multi-layer parison 6 by suitably selecting the molding conditions of the multi-layer parison 6 upon production of the expansion-molded article 1 from the parison 6. Such a core layer functions like a rib and can be expected to have an effect of preventing the occurrence of shrinkage or deformation in the molded article 1. The thickness of the core layer is preferably 0.1 to 5 mm, more preferably 0.1 to 3 mm, particularly preferably 0.1 to 1.5 mm. If the thickness of the core layer is too great, there is a possibility that the closed cell content in the foamed resin layer may be lowered to deteriorate the mechanical strength of the molded article 1.

The foamable molten resin for forming the foamed resin layer 2 of the multi-layer parison 6 is prepared by suitably melting and kneading Specific Polypropylene Resin A, a foaming agent and a cell stabilizer such as talc or the like in an extruder. The molten resin for forming the polypropylene resin layer 3 is prepared by melting and kneading Specific Polypropylene Resin B and optionally various additives in an extruder. The foamable molten resin and the molten resin are united and laminated in a ring die for co-extrusion and co-extruded to a lower-pressure zone, whereby the foamable molten resin can be expanded to obtain the multi-layer parison 6.

A multi-layer parison of a layer structure composed of 3 or more layers like the multi-layer parison illustrated in FIG. 2B used for obtaining an expansion-molded article 1 further having a skin layer 14 on the surface of the resin layer 13 of the expansion-molded article can be obtained by using the same number of extruders as the number of layers and a ring die for co-extrusion of a structure that a plurality of resins can be united and laminated according to the number of layers in the multi-layer parison.

As a foaming agent added to Specific Polypropylene Resin A for forming the foamed resin layer 12 of the expansion-molded article 1, may be used either of a volatile foaming agent or a decomposable foaming agent. In order to obtain a foamed resin layer having a high expansion ratio, however, it is preferable to use a volatile foaming agent. Examples of the volatile foaming agent include aliphatic hydrocarbons such as propane, n-butane, isobutane, n-pentane, isopentane, n-hexane, isohexane and cyclohexane; chlorinated hydrocarbons such as methyl chloride and ethyl chloride; and fluorinated hydrocarbons such as 1,1,2-tetrafluoroethane and 1,1-difluoroethane. Examples of the decomposable foaming agent include azodicarbonamide. The foaming agents mentioned above may be used in combination of two or more thereof. A decomposable foaming agent also having a function as a cell stabilizer may be used in combination with a volatile foaming agent.

The production process of an expansion-molded article 1 according to the present invention will hereinafter be described in more detail with reference to FIGS. 4 and 5. As illustrated in FIG. 4, for example, a foamable molten resin and molten resin(s) for forming a foamed resin layer, a resin layer 3 and a skin layer 4 provided as needed are respectively prepared in separate extruders (not illustrated), and these molten resins are extruded from the extruders to a lower-pressure zone while uniting and laminating them is a die 21, thereby obtaining a multi-layer parison 6. An accumulator may be provided between the extruders and the die 21 or within the die 11 as needed.

A mold split in a male mold 22a and a female mold 22b is closed so as to hold the multi-layer parison 6 formed by the extrusion through the die 21 from its both sides. When the mold is closed, the multi-layer parison 6 is compressed on the inner surface of the mold to bring the multi-layer parison 6 into close con tact with the inner surface of the mold while gradually deforming it into like a flat form. In this case, an air vent (not illustrated) for discharging air in the interior of the parison is provided. When the closing of the mold is completed as illustrated in FIG. 5, at least part of the opposed innermost foamed layers of the multi-layer parison 6 are integrally bonded to each other, thereby obtaining an expansion-molded article 1 according to the present invention. Incidentally, an expansion-molded article 1 obtained by bringing the opposed innermost foamed layers of the multi-layer parison 6 into complete contact with each other to integrate them without any space as illustrated in FIGS. 1A and 1B is preferred because it is excellent in mechanical strength and dimensional stability.

When a pipe 23 for pressure reduction is provided in the mold as illustrated in FIG. 4 to conduct the molding while reducing the pressure between the inner surface of the mold and the outer surface of the parison, the outer surface of the multi-layer parison 6 can be fully brought into close contact with the inner surface of the mold to obtain an expansion-molded article 1 conforming to the shape of the mold with good reproducibility and having good appearance. When a mold having a pattern in its inner surface is used, the transferability of the pattern to the resulting expansion-molded article becomes good, and so the appearance thereof is far excellent.

There is also adopted a process comprising closing an open under end of the multi-layer parison 6 by a parison pinch just after the extrusion of the multi-layer parison 6 through the die 21, blowing air into the parison 6 to inflate it and then conducting molding in the same manner as described above.

Figure 5:
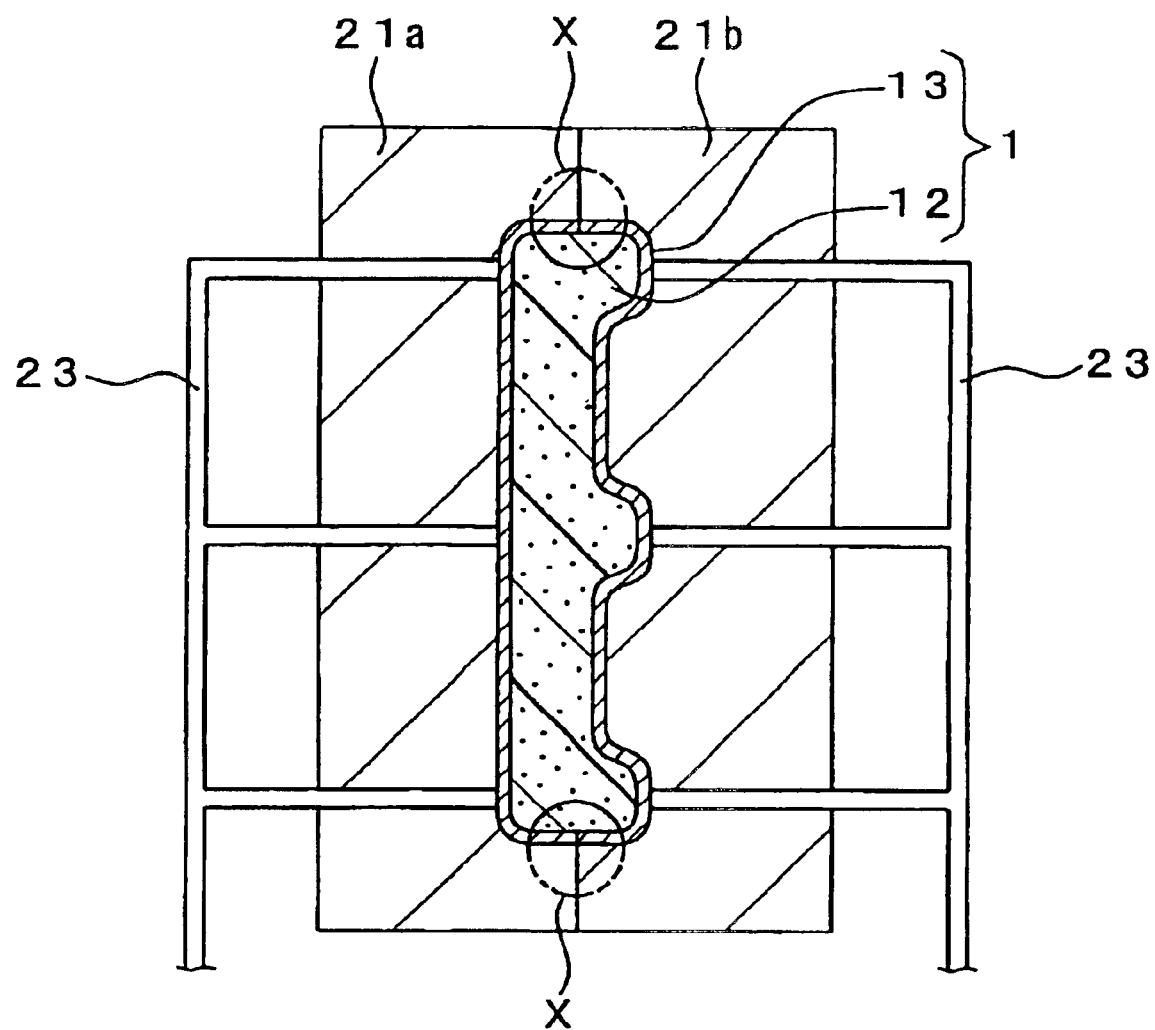
FIG. 5 illustrates a step in the production process of the expansion-molded article according to the present invention.

Incidentally, FIGS. 4 and 5 conceptually illustrate an example of the production process of the expansion-molded article 1 according to the present invention, and the specific procedure for producing the expansion-molded article 1 according to the present invention is not limited to that illustrated. When the multi-layer parison 6 is subjected to deep drawing, a female mold 22b is constructed by a bottom part 24 and side parts 25 provided on 4 sides of the bottom part 24 in such a manner that the set-up and development of the female mold 22b can be conducted by moving the side parts 25. It is preferred that in the course of closing a male mold 22a and the female mold 22b, the molding be conducted while setting up the female mold 22b from a developed state.

In the present specification, a proportion of the fusion-bonded portion of the opposed foamed resin layers in the inner surface of the multi-layer parison 6 is expressed by an area ratio (%) of the fusion-bonded portion. In the present invention, the area ratio of the fusion-bonded portion in the expansion-molded article 1 is preferably at least 25%, preferably at least 60%, more preferably at least 80%, particularly preferably at least 95% from the viewpoint of achieving sufficient mechanical strength and dimensional stability. The area ratio of the fusion-bonded portion can be determined in the following manner.

The expansion-molded article 1 is cut at a plane perpendicular to the extrusion direction of the multi-layer parison 6 used for producing the expansion-molded article so as to divide it into 10 equal pieces. The cut pieces of the expansion-molded article are then arranged in order that the expansion-molded article is made up, thereby determining a length (mm) of the fusion-bonded portion of the opposed foamed resin layers in the inner surface of the multi-layer parison at a right sectional surface in each cut piece of the molded article. A value obtained by doubling this length is regarded as a length, L (mm) of the fusion-bonded portion. On the other hand, when a part of the opposed foamed resin layers in the inner surface of the multi-layer parison is not fusion-bonded to each other to form a void portion, a length, M (mm) of the inner circumferential edge of the void portion is determined. The length, L of the fusion-bonded portion and the length, M of the inner circumferential edge of the void portion are determined as the respective totals of all the fusion-bonded portions and all the void portions in the sectional surface. The area ratio (%) of the fusion-bonded portion is found from L and M thus obtained in accordance with the following equation:

Area ratio (%) of the fusion-bonded portion=$[L/(L+M)] \times 100$.

Incidentally, in a section in which the opposed foamed resin layers in the inner surface of the multi-layer parison are fusion-bonded to each other without void, the area ratio naturally amounts to 100%. The above-described measurement is conducted on all the right sectional surfaces (i.e., 9 sectional surfaces) in the respective cut pieces of the expansion-molded article, and an arithmetic mean of the area ratios of the fusion-bonded portion thus obtained is regarded as the area ratio (%) of the fusion-bonded portion in the expansion-molded article according to the present invention.

In the expansion-molded article 1 according to the present invention, Specific Polypropylene Resin A and Specific Polypropylene Resin B are used as raw materials for forming the foamed resin layer 12 of the expansion-molded article and the resin layer 13 of the expansion-molded article, respectively. When MT and MFR of samples cut out of the foamed resin layer 12 and the resin layer 13 of the expansion-molded article 1 finally formed from these resins are measured, the values of MT and MFR found from the foamed resin layer 12 and the resin layer 13 of the expansion-molded article may differ from the values of MT and MFR of the original Specific Polypropylene Resins A and B due to differences in heat history up to the provision of the expansion-molded article 1, and the like. Besides, even in expansion-molded articles obtained by using the same Specific Polypropylene Resins, the values of MT and MFR found from the foamed resin layers 12 and the resin layers 13 of the resultant expansion-molded articles may differ from each other due to differences in extrusion conditions upon the production of the multi-layer parison, and the like. Incidentally, the MT and MFR of the foamed resin layer 12 of the expansion-molded article are determined by using, as a sample for measurement, that obtained by placing a sample cut out of the foamed resin layer for about 15 minutes in a vacuum oven at 200° C. to heat and melt it, thereby defoaming it. The values of MT and MFR of the foamed resin layer 12 and the resin layer 13 determined from a sample cut out of the expansion-molded article are values determined in accordance with the same method as in the measurement of MT and MFR of Specific Polypropylene Resins A and B.

In the expansion-molded article 1 according to the present invention, in spite of the heat history in the course of the production of the expansion-molded article 1 according to the present invention, it is required from the viewpoint of achieving the intended object of the present invention that when MT and MFR are determined from samples cut out of the foamed resin layer 12 and the resin layer 13 in the above-described manner, the melt tension, MT (gf) and the melt flow rate, MFR (g/10 min) obtained by measurement to the polypropylene resin forming the foamed resin layer 12 in the expansion-molded article satisfy the following relationship (1), and moreover the melt flow rate, MFR obtained by measurement to the polypropylene resin forming the resin layer 13 of the expansion-molded article is at least 0.3 (g/10 min), and the melt tension, MT (gf) and the melt flow rate, MFR (g/10 min) obtained by measurement to the polypropylene resin forming the resin layer 13 satisfy the following relationship (2), or the melt flow rate; MFR obtained by measurement to the polypropylene resin forming the resin layer 13 of the expansion-molded article is not lower than 0.2 (g/10 min), but lower than 0.3 (g/10 min), and the melt tension, MT obtained by measurement to the polypropylene resin forming the resin layer 13 is at least 10 (gf):

$$\log \text{MT} > -0.74 \log \text{MFR} + 0.66 \qquad (1)$$

$$\log \text{MT} > -1.02 \log \text{MFR} + 0.47 \qquad (2)$$

In order to provide an expansion-molded article excellent in appearance and mechanical properties even in a large-sized expansion-molded article, a deep-draw expansion-molded article or a large-sized, deep-draw expansion-molded article, it is preferable that the melt tension, MT (gf) and the melt flow rate, MFR (g/10 min) obtained by measurement to the polypropylene resin forming the foamed resin layer 12 in the expansion-molded article satisfy the following relationship (3), and moreover the melt flow rate, MFR obtained by measurement to the polypropylene resin forming the resin layer 13 of the expansion-molded article is at least 0.5 (g/10 min), and the melt tension, MT (gf) and the melt flow rate, MFR (g/10 min) obtained by measurement to the polypropylene resin forming the resin layer 13 satisfy the following relationship (4), or the melt flow rate, MFR obtained by measurement to the polypropylene resin forming the resin layer 13 of the expansion-molded article is not lower than 0.2 (g/10 min), but lower than 0.5 (g/10 min), and the melt tension, MT obtained by measurement to the polypropylene resin forming the resin layer 13 is at least 10 (gf):

$$\log MT > -0.74 \log MFR + 0.79 \quad (3)$$

$$\log MT > -1.02 \log MFR + 0.69 \quad (4)$$

Since the expansion-molded article according to the present invention is obtained by molding the multi-layer parison 6 having the resin layer 3 composed of a polypropylene resin on the outer surface of the foamed resin layer 2 composed of a polypropylene resin, the adhesion of the foamed resin layer 12 to the resin layer 13 in the expansion-molded article 1 according to the present invention is high. In addition, since MT and MFR of the polypropylene resins cut out of the foamed resin layer 12 and the resin layer 13 satisfy the respective relationships, the thickness of the resin layer 13 in the expansion-molded article 1 becomes uniform, the expansion ratio of the foamed resin layer 12 is sufficiently high, the thickness thereof is also sufficiently great, and the appearance of the molded article is excellent.

In the expansion-molded article 1 according to the present invention, the density of the foamed resin layer 12 is preferably 20 to 500 kg/m$^3$, more preferably 25 to 400 kg/m$^3$. If the density of the foamed resin layer 12 exceeds 500 kg/m$^3$, it is hard to say that the molded article is light-weight, and physical properties such as heat insulating property may possibly be deteriorated. If it is attempted to make the density of the foamed resin layer 12 lower than 20 kg/m$^3$, the cell membrane making up the foamed resin layer 2 of the multi-layer parison becomes too thin, resulting in a possibility that molding may be difficult due to easy collapse of cells upon molding of the parison, and so the expansion-molded article 1 may not be provided as a good product.

The density of the foamed resin layer 12 in the expansion-molded article 1 is determined in accordance the following method. A portion of the foamed resin layer 12 is cut out of the expansion-molded article 1, the weight (g) of the sample cut out is divided by a volume (cm$^3$) found from the external size of the sample to convert the value found into a kg/m$^2$ unit. Since the density of the foamed resin layer 12 may vary according to the place measured, samples are cut out of the foamed resin layer 12 of the expansion-molded article at 10 or more places in different portions such as a bottom and sides, and the density of each sample is measured, and the maximum and minimum values are excluded from the resultant measured values to take an arithmetic mean of the remaining values, thereby regarding the average value as the density of the foamed resin layer 12 of the expansion-molded article.

The thickness of the resin layer 13 of the expansion-molded article 1 according to the present invention is preferably 100 µm to 10 mm. If the thickness of the resin layer 13 is too small, the molded article 1 has a possibility that the surface smoothness thereof may be deteriorated to make the surface appearance thereof poor. If the thickness of the resin layer 13 is too great on the other hand, the whole weight of the expansion-molded article 1 becomes heavy, so that it is hard to say that the molded article is light-weight according to the use of the molded article 1. The thickness of the resin layer 13 is determined by measurement of the section of the molded article 1. In this case, the measurement may also be conducted by enlarging the section through a microscope as needed, and using an enlarged projection drawing. Since the thickness of portions of the resin layer 13 situated at the upper and lower, and right and left peripheries of the expansion-molded article 1 near mold clamps for the parison (X in FIG. 5) may exhibit a small value, and so it is preferred that the thickness of another main portion than those near the clamps should fall within the above range.

The overall density of the expansion-molded article 1 according to the present invention is generally 20 to 800 kg/m$^3$, preferably 20 to 400 kg/m$^3$. If the overall density of the expansion-molded article 1 exceeds 800 kg/m$^3$, the lightweight property and heat insulating property of the molded article may possibly be deteriorated. If the overall density of the molded article 1 is lower than 20 kg/m$^2$ on the other hand, the mechanical properties such as compressive strength of the molded article may possibly be deteriorated.

The overall density of the expansion-molded article 1 is a value determined by dividing the weight (kg) of the expansion-molded article 1 by its volume (m$^3$) measured by sinking the molded article 1 in water. However, even when void portions defined by non-fusion-bonded portions at the inner surface of the multi-layer parison are present in the interior of the molded article 1, the volume of such void portions is not subtracted from the value determined as the volume of the molded article.

FIGS. 1A and 1B illustrate sectional shapes of specifically exemplified containers formed of the expansion-molded article 1 according to the present invention, in which the multi-layer parison is molded in such a manner that the opposed innermost foamed layers of the multi-layer parison are completely fusion-bonded to each other without any space, and a container space is defined.

In such containers as described above, those in which the overall density is 30 to 400 kg/M$^3$ are excellent in light-weight property and heat insulating property. Besides, those in which the thickness of the resin layer 13 is 200 to 5 mm are excellent in high durability and surface smoothness, well balanced between appearance and lightweight property, undergo only minimal shrinkage after molding and have excellent mechanical strength against external force. Further, they can be sterilized with steam due to their excellent heat resistance and are hence particularly suitable for use as returnable containers.

Figure 7:
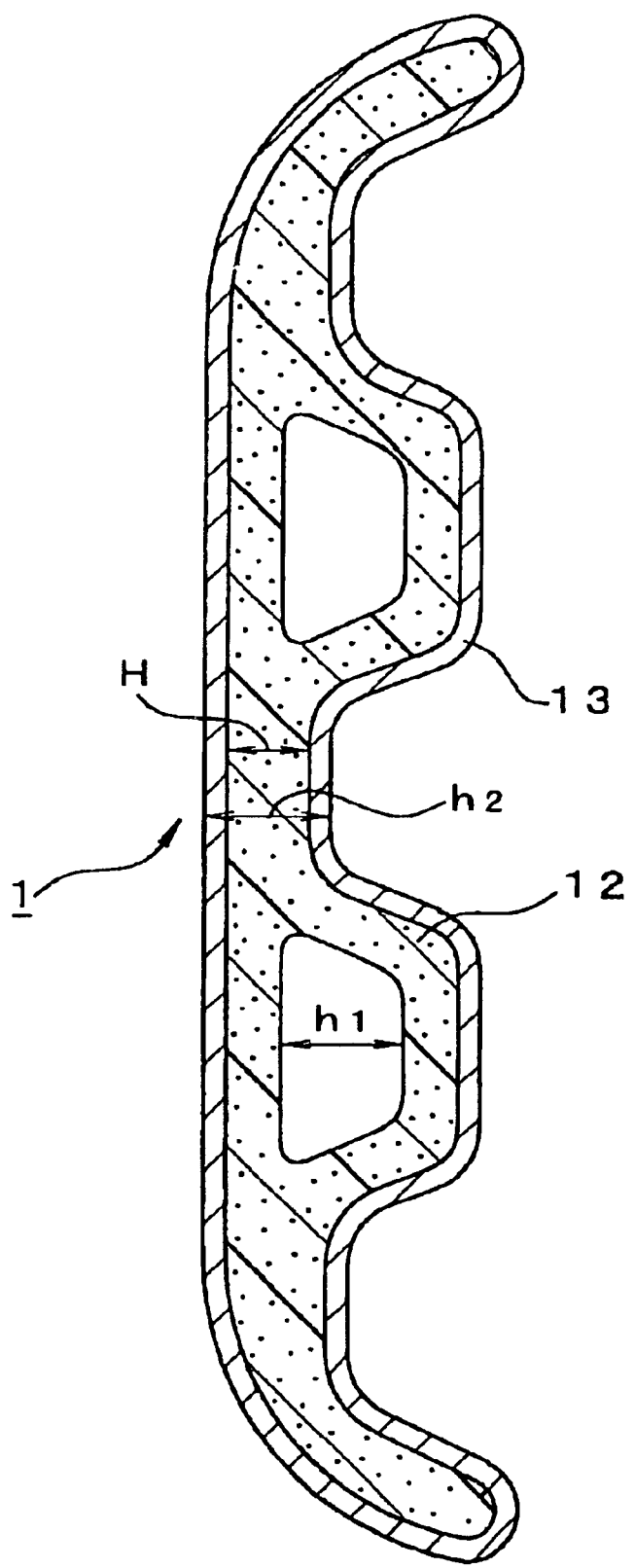
FIG. 7 is a horizontal sectional view of a bumper as an example of the expansion-molded article according to the present invention.
Figure 8:
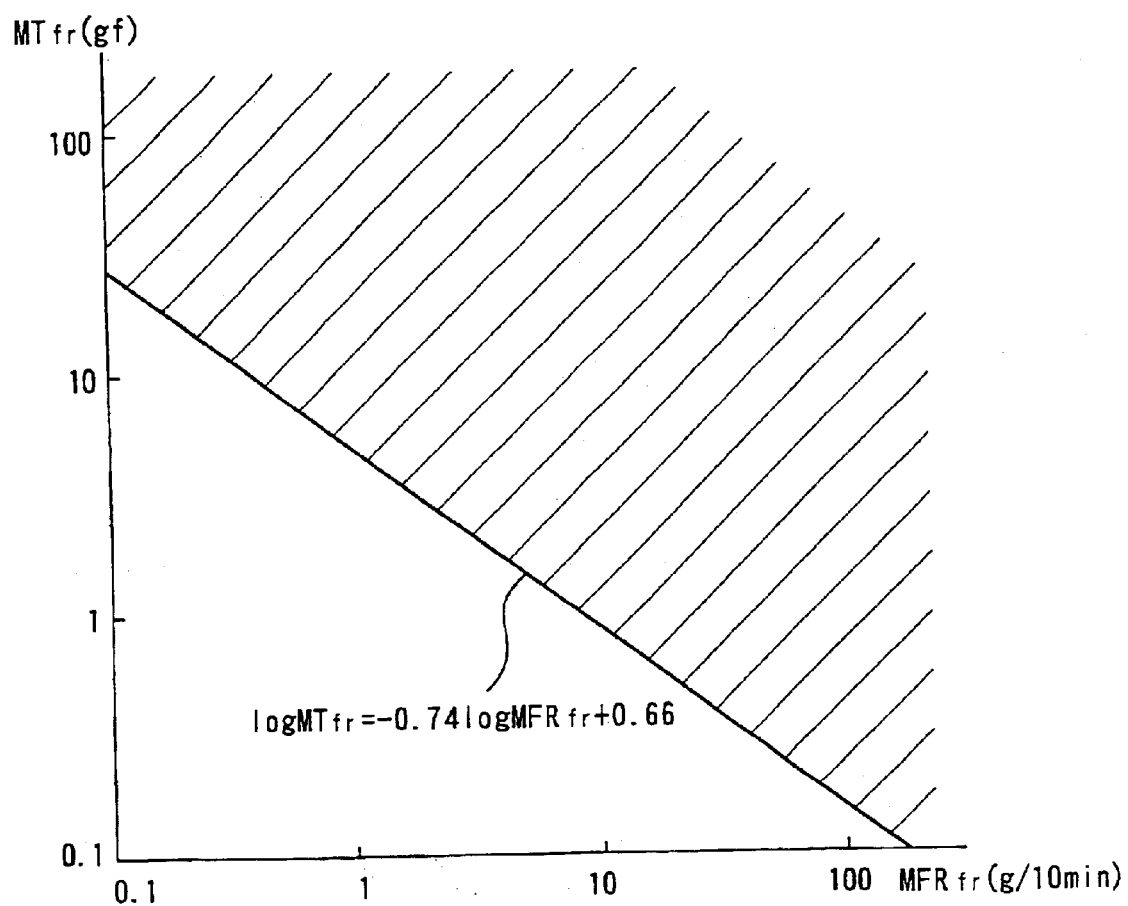
FIG. 8 is a graphical representation of the relationship log $MT_{fr} > -0.74$ log $MFR_{fr} + 0.66$ drawn on a double logarithmic chart where $MT_{fr}$ is the vertical axis and represents the melt tension of a foamed layer and $MFR_{fr}$ represents the melt flow rate of the foamed layer and is the horizontal axis.
Figure 9:
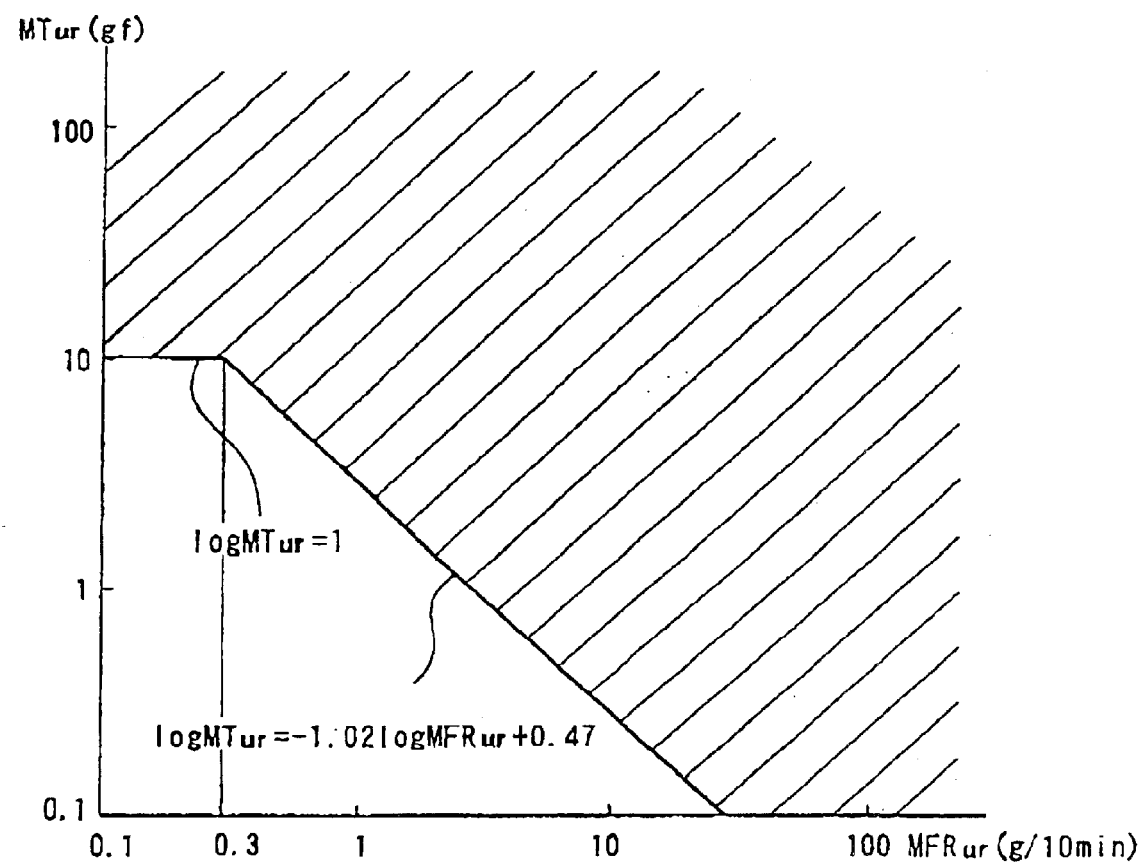
FIG. 9 is a graphical representation of the relationships log $MT_{ur} > -1.02$ log $MFR_{ur} + 0.47$ where $MFR_{ur} \geq 0.3$ and $MT_{ur} \geq 10$ (gf) where $0.1 \leq MFR_{ur} < 0.3$ drawn on a double logarithmic chart where $MT_{ur}$ is the vertical axis and represents the melt tension of an unfoamed layer and $MFR_{ur}$ is the horizontal axis and low rate of the unfoamed layer.
Figure 10:
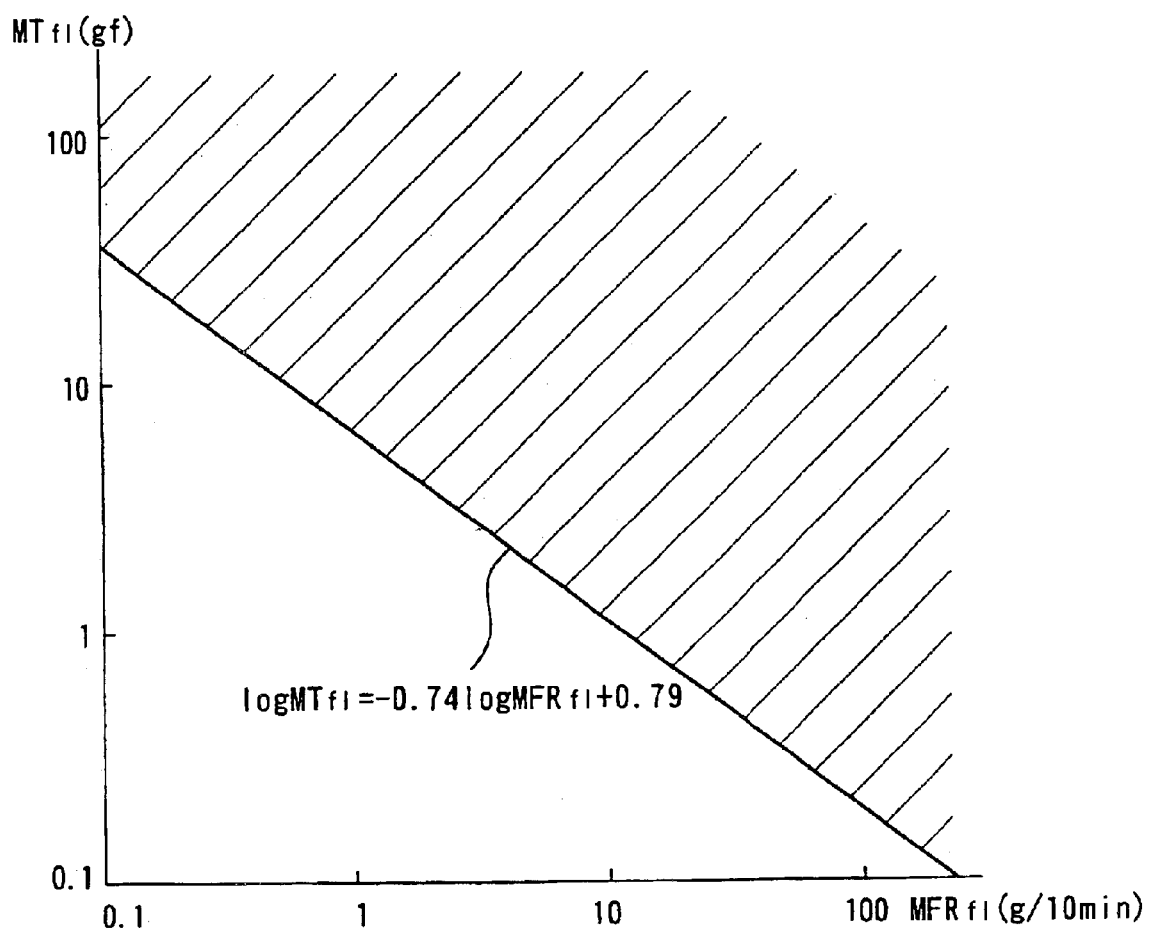
FIG. 10 is a graphical representation of the relationship $\log MT_{fl} > -0.74 \log MFR_{fl} + 0.79$ drawn on a double logarithmic chart where $MT_{fl}$ is the vertical axis and represents a sample cut out from a foamed resin layer of a skin-bearing article and $MFR_{fl}$ is the horizontal axis and represents the melt flow rate of the sample cur out from the foamed resin layer.
Figure 11:
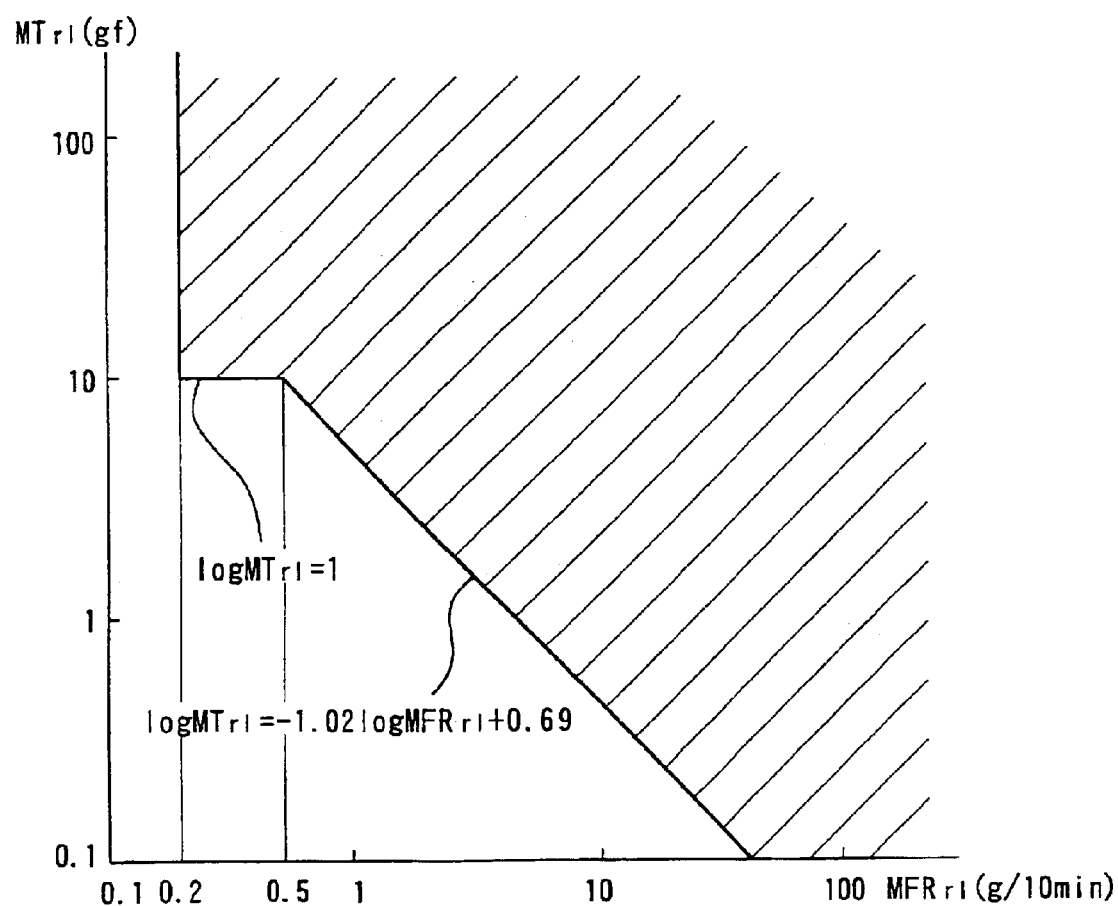
FIG. 11 is a graphical representation of the relationships $\log MT_{rl} > -1.02 \log MFR_{rl} + 0.69$ where $MFR_{rl} \geq 0.5$ and $MT_{rl} \geq 10$ (gf) where $0.2 \leq MFR_{rl} < 0.5$ drawn on a double logarithmic chart where $MT_{rl}$ is the vertical axis and represents the melt tension of a resin layer and $MFR_{rl}$ is the horizontal axis and represent the melt flow rate of the resin layer.

FIG. 7 is a horizontal sectional view of an automotive bumper illustrated as a specific example of a shock-absorbing material for automobile formed of the expansion-molded article 1 according to the present invention. The expansion-molded article 1 illustrated in FIG. 7 is obtained by compression-molding the multi-layer parison 6, and has a structure that the opposed inner-side foamed resin layers of the multi-layer parison 6 are fusion-bonded to each other at the central portion and both ends of the molded article 1 and not fusion-bonded to form void portions between the central portion and both ends. When the expansion-molded article 1 according to the present invention is used as a shock-absorbing material for automobile such as the above-described bumper, the overall density thereof is controlled to 25 to 300 kg/m$^3$, thereby providing a shock-absorbing material which is light-weight and excellent in energy-absorbing efficiency. Besides, the thickness of the resin layer 13 is controlled to 200 to 7,000 µm, thereby providing a shock-absorbing material having excellent surface smoothness and impact resistance. The volume of the shock-absoibing material formed of the molded article according to the present invention is preferably 5,000 to 400,000 cm$^3$.

The present invention will hereinafter be described in more detail by the following Examples. The melt tensions, MT (gf) and melt flow rates, MFR (g/10 min) of polypropylene resins used in the following Examples and Comparative Examples are shown in Table 1.

TABLE 1

| Polypropylene resin | | MT (gf) | MFR (g/10 min) |
|---|---|---|---|
| Resin A | SD632 (propylene resin); product of Montell Canada Co. | 20 | 3 |
| Resin B | PF814 (homopolymer); product of Montell Canada Co. | 22 | 3 |
| Resin C | PM620A (propylene-ethylene random copolymer); product of Nippon Polyolefin K.K. | 0.4 | 8 |
| Resin D | J700GP (homopolymer); product of Idemitsu Petrochemical Co., Ltd. | 0.4 | 8 |
| Resin E | SB7000 (propylene-ethylene block copolymer); product of Chisso Corporation | 26 | 0.12 |
| Resin F | EG7F (propylene-ethylene random copolymer); product of Nippon Polychem K.K. | 1.6 | 2 |
| Resin G | E150GK (propylene-ethylene block copolymer); product of Idemitsu Petrochemical Co., Ltd. | 3.9 | 0.6 |
| Resin H | Mixture of Resin A/Resin C = 50/50 (weight ratio) | 8 | 6 |
| Resin I | Mixture of Resin B/Resin D = 50/50 (weight ratio) | 8 | 6 |

EXAMPLE 1

Into 100 parts by weight of Resin A, were incorporated 3 parts by weight of a master batch of cell stabilizer prepared by blending 5parts by weight of sodium citrate and 10 parts by weight of talc into 100 parts by weight of a low density polyethylene resin. The resultant mixture was fed to an extruder having a bore diameter of 65 mm, and isobutane as a volatile foaming agent was forced in a proportion of 2 parts by weight per 100 parts by weight of Resin A into the resin in the extruder and kneaded to prepare a foamable molten resin.

On the other hand, a colorant was mixed into Resin A, and the mixture was fed to an extruder having a bore diameter of 40 mm and heated and melted to prepare a non-foamable molten resin. After the molten resins melted and kneaded in the respective extruders were then charged into separate accumulators connected to the extruders, the foamable molten resin and the non-foamable molten resin were injected from the respective accumulators so as to cause them to join in a die, and to laminate a resin layer formed of the non-foamable molten resin on the outer surface of a foamed resin layer formed by expansion of the foamable molten resin, and extruded through the die to form a multi-layer parison with the resin layer laminated on the outer surface of the foamed resin layer.

A box-shaped split mold arranged right under the die was then closed so as to hold the multi-layer parison thus extruded as illustrated in FIGS. 6A and 6B, thereby deforming the multi-layer parison into a flat form by the inner surface of the mold, and the pressure within the mold was reduced to bring the multi-layer parison into close contact with the inner surface of the mold, thereby molding it. Thereafter, the resultant molded article was cooled and released from the mold to obtain an expansion-molded article in the form of a truncated cone-like container having an external size at an opening part of 300 mm×260 mm, an external size at a bottom part of 260 mm×180 mm, a height of 110 mm and a wall thickness of about 20 mm. As the mold, was used that subjected to a satinizing processing at its inner surface. The expansion-molded article thus obtained had good surface profile, and a satin pattern on the inner surface of the mold finely appeared on the surface of the molded article. In addition, appearance failure caused by shrinkage deformation, buckling and/or the like was not observed. The section of the molded article was observed. As a result, the molded article was found to have a resin layer formed of the outer resin layer of the multi-layer parison on the surface of the foamed resin layer of the expansion-molded article, and the opposed inner surfaces of the foamed resin layer in the multi-layer parison were fully fusion-bonded to each other without any space.

The foamed resin layer was cut out of the expansion-molded article to measure the MFR and MT of the resin forming the foamed resin layer, thereby finding values of log MT and −0.74 log MFR+0.66. The values are shown in Table 2. Further, the resin layer was cut out of the expansion-molded article to measure the MFR and MT of the resin forming the resin layer, thereby finding values of log MT and −1.02 log MFR+0.47. The values are shown in Table 3. Further, the thickness of the resin layer, thickness of the foamed resin layer and density of the foamed resin layer of the expansion-molded article, and the overall density of the expansion-molded article were measured, and the results thereof are shown in Table 4. Incidentally, numerical values indicated in parentheses in numerical values shown in Tables 2 and 3 are values in the original resins (base resins) used for producing the respective multi-layer parisons.

TABLE 2

Resin forming foamed resin layer of expansion-molded article

| | Kind of resin | MFR (g/10 min) | MT (gf) | Value of log (MT) | Value of −0.74 log (MFR) + 0.66 |
|---|---|---|---|---|---|
| Ex. 1 | Resin A | 4.5 (3) | 6 (20) | 0.78 (1.30) | 0.18 (0.31) |
| Ex. 2 | Resin A | 4.5 (3) | 6 (20) | 0.78 (1.30) | 0.18 (0.31) |
| Ex. 3 | Resin A | 4.5 (3) | 6 (20) | 0.78 (1.30) | 0.18 (0.31) |
| Ex. 4 | Resin B | 8.1 (3) | 1.6 (22) | 0.20 (1.34) | 0.012 (0.31) |
| Ex. 5 | Resin B | 8.1 (3) | 1.6 (22) | 0.20 (1.34) | 0.012 (0.31) |
| Ex. 6 | Resin B | 8.1 (3) | 1.6 (22) | 0.20 (1.34) | 0.012 (0.31) |
| Ex. 7 | Resin B | 8.1 (3) | 1.6 (22) | 0.20 (1.34) | 0.012 (0.31) |
| Ex. 8 | Resin A | 4.5 (3) | 6 (20) | 0.78 (1.30) | 0.18 (0.31) |
| Ex. 9 | Resin A | 4.5 (3) | 6 (20) | 0.78 (1.30) | 0.18 (0.31) |
| Ex. 10 | Resin A | 4.4 (3) | 6.5 (20) | 0.81 (1.30) | 0.18 (0.31) |
| Comp. Ex. 1 | Resin A | 4.5 (3) | 6 (20) | 0.78 (1.30) | 0.18 (0.31) |
| Comp. Ex. 2 | Resin C | 8.5 (8) | 0.4 (0.4) | −0.40 (310.40) | 0.028 (−0.008) |
| Comp. Ex. 3 | Resin F | 2.6 (2) | 1.5 (1.6) | −0.18 (310.20) | 0.35 (0.44) |

TABLE 3

Resin forming foamed resin layer of expansion-molded article

| | Kind of resin | MFR (g/10 min) | MT (gf) | Value of log (MT) | Value of −1.02 log (MFR) + 0.47 |
|---|---|---|---|---|---|
| Ex. 1 | Resin A | 5.6 (3) | 5.0 (20) | 0.70 (1.30) | −0.29 (−0.017) |
| Ex. 2 | Resin C | 8.4 (8) | 0.4 (0.4) | −0.40 (−0.40) | −0.47 (−0.45) |

TABLE 3-continued

Resin forming foamed resin layer of expansion-molded article

| | Kind of resin | MFR (g/10 min) | MT (gf) | Value of log (MT) | Value of −1.02 log (MFR) + 0.47 |
|---|---|---|---|---|---|
| Ex. 3 | Resin H | 7.1 (6) | 4.1 (8) | 0.61 (0.90) | −0.40 (−0.32) |
| Ex. 4 | Resin B | 10.1 (3) | 0.4 (22) | −0.40 (1.34) | −0.55 (−0.017) |
| Ex. 5 | Resin I | 7.1 (6) | 3.5 (8) | 0.54 (0.90) | −0.40 (−0.32) |
| Ex. 6 | Resin D | 6.4 (8) | 6.0 (0.4) | 0.78 (−0.40) | −0.35 (−0.45) |
| Ex. 7 | Resin E | 0.3 (0.12) | 16.4 (26) | 1.21 (1.41) | 1.00 (1.40) |
| Ex. 8 | Resin F | 2.8 (2) | 1.6 (1.6) | 0.20 (0.20) | −0.013 (0.16) |
| Ex. 9 | Resin H | 7.1 (6) | 4.1 (8) | 0.61 (0.90) | −0.40 (−0.32) |
| Ex. 10 | Resin A | 5.5 (3) | 5.4 (20) | 0.74 (1.30) | −0.29 (−0.017) |
| Comp. Ex. 1 | Resin G | 0.9 (0.6) | 2.8 (3.9) | 0.45 (0.59) | 0.52 (0.70) |
| Comp. Ex. 2 | Resin H | 7.1 (6) | 4.1 (8) | 0.61 (0.90) | −0.40 (−0.32) |
| Comp. Ex. 3 | Resin H | 7.1 (6) | 4.1 (8) | 0.61 (0.90) | −0.40 (−0.32) |

TABLE 4

Expansion-molded article

| | Thickness of resin layer (mm) | | Thickness of *3 foamed resin layer (mm) | | Density of foamed resin layer (kg/m³) | Overall density of expansion molded article (kg/m³) | Appearance |
|---|---|---|---|---|---|---|---|
| | Bottom | Side | Bottom | Side | | | |
| Ex. 1 | 1.2 | 0.9 | 16 | 16 | 150 | 250 | ◎ |
| Ex. 2 | 1.1 | 0.9 | 16 | 16 | 150 | 240 | ◎ |
| Ex. 3 | 1.2 | 0.9 | 16 | 16 | 150 | 250 | ◎ |
| Ex. 4 | 1.2 | 0.9 | 16 | 16 | 130 | 230 | ○ |
| Ex. 5 | 1.1 | 0.9 | 16 | 16 | 130 | 220 | ◎ |
| Ex. 6 | 1.1 | 0.9 | 16 | 16 | 130 | 220 | ◎ |
| Ex. 7 | 1.2 | 0.9 | 16 | 16 | 170 | 270 | ○ |
| Ex. 8 | 1.2 | 0.9 | 16 | 16 | 150 | 260 | Δ |
| Ex. 9 | 0.9 | 0.8 | 19 | 14 | 150 | 240 | ◎ |
| Ex. 10 | 35 *4 | | 50 *5 | | 180 | 210 | ◎ |
| Comp. Ex. 1 | 1.2 | 0.9 | 16 | 16 | 150 | 260 | *1 |
| Comp. Ex. 2 | *2 | *2 | *2 | *2 | *2 | *2 | *2 |
| Comp. Ex. 3 | *2 | *2 | *2 | *2 | *2 | *2 | *2 |

*1 The resin layer of the expansion-molded article was partly broken, and the foamed resin layer was observed.
*2 Measurement was not conducted due to a failure to obtain an expansion-molding article.
*3 The shortest length of the foamed resin layer present between the opposed resin layers.
*4 The thickness of the resin layer in FIG. 7.
*5 The thickness of the H portion in FIG. 7

Incidentally, the evaluation of appearance in Table 4 was conducted by visually observing a container-like expansion-molded article sample to judge the appearance in accordance with the following standard:

◎: Excellent in surface smoothness and reproducibility to a mold without causing a scale pattern, cracks and/or holes;

○: Causing none of scale pattern, cracks and holes;

Δ: Resin melt flow marks are slightly observed on a part of the side wall of the container-like expansion-molded article though neither cracks or holes were observed.

EXAMPLES 2 to 6, 8 and 9

Multi-layer parisons were separately obtained in the same manner as in Example 1 except that their corresponding resins for forming a foamed resin layer of an expansion-molded article shown in Table 2 and their corresponding resins for forming a resin layer of an expansion-molded article shown in Table 3 were respectively used. Each of the parisons was molded to obtain a container-like expansion-molded article. The expansion-molded articles thus obtained had good appearance like Example 1. In the container-like expansion-molded articles, the opposed inner surfaces of the foamed resin layer in the multi-layer parison were fully fusion-bonded to each other without any space. The various properties of the expansion-molded articles are shown in Tables 2 to 4. In Example 4, a mixed volatile foaming agent composed of 30% by weight of isobutane and 70% by weight of n-butane was used in place of isobutane used as the volatile foaming agent in Example 1.

EXAMPLE 7

An expansion-molded article was obtained in the same manner as in Example 1 except that a multi-layer parison obtained in the same manner as in Example 1 except that its corresponding resin for forming a foamed resin layer of an expansion-molded article shown in Table 2 and its corresponding resin for forming a resin layer of an expansion-molded article shown in Table 3 were used, and the amount of the volatile foaming agent was changed to 1.8 parts by weight per 100 parts by weight of Resin B and the expansion-molded article was molded by means of a box-shaped multipart mold different from the mold used in Example 1. The expansion-molded articles thus obtained was not observed causing appearance failure by shrinkage deformation, buckling and/or the like, but had good appearance. In the expansion-molded articles, the opposed inner surfaces of the foamed resin layer in the multi-layer parison were fully fusion-bonded to each other without any space. The various properties of the expansion-molded articles are shown in Tables 2 to 4. In Example 7, the box-shaped multipart mold was used as a mold for molding the multi-layer parison to form an expansion-molded article in the form of a rectangular-parallelepiped container having an external size at an opening part of 300 mm×230 mm, a height of 120 mm and a wall thickness of about 20 mm.

EXAMPLE 10

A multi-layer parison was formed in the same manner as in Example 1 except that the amount of the foaming agent was changed to 1.9 parts by weight. A bumper-shaped mold arranged right under the die was then closed so as to hold the multi-layer parison thus extruded as illustrated in FIGS. 4 and 5, thereby deforming the multi-layer parison into like a flat form by the inner surface of the mold, and the pressure within the mold was reduced to bring the multi-layer parison into close contact with the inner surface of the mold, thereby molding it. Thereafter, the resultant molded article was cooled and released from the mold to obtain a shock-absorbing material for automobile in the form of a bumper having an external size of width=1,400 mm, height=260 mm, maximum thickness, $h_1$ at a hollow part in FIG. 7=110 mm and wall thickness, $h_2$ portion in FIG. 7=about 60 mm.

The expansion-molded article thus obtained had good surface profile, and appearance failure caused by shrinkage deformation, buckling and/or the like was not observed. The section of the molded article was observed. As a result, the molded article was found to have a resin layer formed of the outer resin layer of the multi-layer parison on the surface of the foamed resin layer of the expansion-molded article, and the area ratio of the fusion-bonded portion in the inner surface of the expansion-molded article was 66%.

The foamed resin layer was cut out of the expansion-molded article to measure the MFR and MT of the resin forming the foamed resin layer, thereby finding values of log MT and −0.74 log MFR+0.66. The values are shown in Table 2. Further, the resin layer was cut out of the expansion-molded article to measure the MFR and MT of the resin forming the resin layer, thereby finding values of log MT and −1.02 log MFR+0.47. The values are shown in Table 3. Further, the thickness of the resin layer, thickness of the foamed resin layer and density of the foamed resin layer of the expansion-molded article, and the overall density of the expansion-molded article were measured, and the results thereof are shown in Table 4. Incidentally, numerical values indicated in parentheses in numerical values shown in Tables 2 and 3 are values in the original resins (base resins) used for producing the respective multi-layer parisons.

COMPARATIVE EXAMPLE 1

A multi-layer parison was obtained in the same manner as in Example 1 except that its corresponding resin for forming a foamed resin layer of an expansion-molded article shown in Table 2 and its corresponding resin for forming a resin layer of an expansion-molded article shown in Table 3 were used, and the parison thus obtained was molded in the same manner as in Example 1 to obtain a container-like expansion-molded article. The molded article thus obtained was observed causing break at a part of the resin layer and partially exposing the foamed resin layer on the surface. The various properties of the container-like expansion-molded article are shown in Tables 2 to 4.

COMPARATIVE EXAMPLES 2 and 3

Their corresponding resins for forming a foamed resin layer of an expansion-molded article shown in Table 2 and their corresponding resins for forming a resin layer of an expansion-molded article shown in Table 3 were separately used to attempt to product a multi-layer parison in the same manner as in Example 1. However, the foamed resin layer was shrunk due to cell collapse and scarcely expanded, and so any good multi-layer parison was not obtained. This multi-layer parison was molded in the same manner as in Example 1. However, no expansion-molded article was obtained.

As described above, the expansion-molded articles according to the present invention are such that the thickness and density of the foamed polypropylene resin layer making up a multi-layer expansion-molded article of a polypropylene resin can be optionally selected or controlled by adopting the above-described constitution, and so those having a foamed resin layer having a great thickness and a high expansion ratio may also be provided. In addition, the expansion-molded articles according to the present invention are uniform in the thickness of the polypropylene resin layer making up the molded articles and good in appearance without causing a scale pattern, cracks, holes and/or the like in the surface of the resin layer.

The production process of an expansion-molded article according to the present invention comprises molding a multi-layer parison having a resin layer on the outer surface of a foamed resin layer in a mold in such a manner that at least part of the opposed innermost foamed layers of the multi-layer parison are fusion-bonded to each other. Therefore, complicated production processes and apparatus like the conventional process for obtaining a multi-layer expansion-molded article of a polypropylene resin of the structure that a foamed resin layer has a skin layer on its surface are unnecessary. In addition, specific polypropylene resins are used as base resins, thereby improving the extension and drawdown tendency of the resin layer of the multi-layer parison and moreover improving the expansion and drawdown tendency of the foamed resin layer. Therefore, multi-layer expansion-molded articles of a polypropylene resin that have heretofore been difficult to obtain by the process of molding a multi-layer parison can be provided with good productivity.

The expansion-molded articles according to the present invention are excellent in lightweight property, heat resistance, chemical resistance, recycling ability, heat insulating property, cushioning property, damping property, mechanical strength such as compressive, tensile and bending strength. The expansion-molded articles according to the present invention are also suitable for use as deep-draw expansion-molded articles and large-sized expansion-molded articles, and can be utilized as, to say nothing of returnable containers, light-weight heat insulating panels for floor, door or the like; structural members for automobile (particularly, shock-absorbing materials for automobile), such as pillars, bumpers, instrument panels, spoilers, fenders, side steps, door trims, grille guards and trunk boards; desks; chairs; floats; surfboards; pallets; etc.

What is claimed is:

1. A skin-bearing article molded from a multi-layer foamed parison having inner surfaces mutually welded, comprising:

a foamed polypropylene resin layer having a density of 25 to 400 kg/m³ formed from a first raw resin, and an unfoamed polypropylene resin layer formed from a second raw resin provided on the outer side of the foamed polypropylene resin layer said first raw resin forming the foamed polypropylene resin layer having a melt tension, $MT_{fr}$ (gf), and a melt flow rate, $MFR_{fr}$ (g/10 min), and satisfying the following relationship (1), and said second raw resin forming the unfoamed polypropylene resin layer having a melt tension, $MT_{ur}$ (gf), and a melt flow rate, $MFR_{ur}$ (g/10 min), and satisfying the following relationships (2) and (3)

$$\log MT_{fr} > -0.74 \log MFR_{fr} + 0.66 \quad (1)$$

$$\log MT_{ur} > -1.02 \log MFR_{ur} + 0.47 \text{ where } MFR_{ur} \geq 0.3 \quad (2)$$

$$MT_{ur} \geq 10 \text{ (gf) where } 0.1 \leq MFR_{ur} < 0.3 \quad (3).$$

2. A skin-bearing article molded from a multi-layer foamed parison having inner surfaces mutually welded, comprising:

a foamed polypropylene resin layer having a density of 25 to 400 kg/m³, and an unfoamed polypropylene resin layer provided on the outer side of the foamed polypropylene resin layer the foamed polypropylene resin layer in the skin-bearing article having a melt tension, $MT_{fl}$ (gf), and a melt flow rate, $MFR_{fl}$ (g/10 min), and satisfying the following relationship (4), and the unfoamed polypropylene resin layer on the surface of the foamed polypropylene resin layer having a melt tension, $MT_{rl}$ (gf), and a melt flow rate, $MFR_{rl}$ (g/10 min), and satisfying the following relationships (5) and (6)

$$\log MT_{fl} > -0.74 \log MFR_{fl} + 0.79 \quad (4)$$

$$\log MT_{rl} > -1.02 \log MFR_{rl} + 0.69 \text{ where } MFR_{rl} \geq 0.5 \quad (5)$$

$$MT_{rl} \geq 10 \text{ (gf) where } 0.2 \leq MFR_{rl} < 0.5 \quad (6).$$

3. The skin-bearing article according to claim 1 or 2, wherein the thickness of the unfoamed polypropylene resin layer formed on the surface of the foamed polypropylene resin layer is 100 μm to 10 mm, and the overall density of the skin-bearing article is 20 to 400 kg/m³.

4. The skin-bearing article according to claim 1 or 2, wherein the area ratio of the mutually welded portion in the inner surface of the skin-bearing article is at least 25%.

5. The skin-bearing article according to claim 1 or 2, wherein the area ratio of the mutually welded portion in the inner surface of the skin-bearing article is at least 60%.

6. The skin-bearing article according to claim 1 or 2, wherein the area ratio of the mutually welded portion in the inner surface of the skin-bearing article is at least 80%.

7. The skin-bearing article according to claim 1 or 2, wherein the area ratio of the mutually welded portion in the inner surface of the skin-bearing article is at least 95%.

8. The skin-bearing article according to claim 1 or 2, which further has a skin layer formed of a synthetic resin on the outer side of the unfoamed polypropylene resin layer.

9. A container formed of the skin-bearing article according to claim 1 or 2, wherein the overall density of the container is 30 to 400 kg/m³, and the thickness of the unfoamed polypropylene resin layer is 200 μm to 5 mm.

10. A shock-absorbing material for automobile formed of the skin-bearing article according to claim 1 or 2, wherein the overall density of the shock-absorbing material is 25 to 300 kg/m³ and the thickness of the unfoamed polypropylene resin layer is 200 μm to 7 mm.

11. A member for automobile formed of the skin-bearing article according to claim 1 or 2.

12. The member for automobile according to claim 11, wherein the member for automobile is a member selected form among a bumper, pillar, instrument panel, spoiler, fender, side step, door trim, grille guard and trunk board.

* * * * *